US012544413B2

(12) United States Patent
Santini

(10) Patent No.: US 12,544,413 B2
(45) Date of Patent: Feb. 10, 2026

(54) COMPOSITION WITH ANTIBACTERIAL AND RE-EPITHELIALIZING ACTION INCLUDING PROBIOTICS

(71) Applicant: EOS2021 S.R.L, Ardea (IT)

(72) Inventor: Gino Santini, Ardea (IT)

(73) Assignee: EOS2021 S.R.L., Ardea (IT)

( * ) Notice: Subject to any disclaimer, the term of this patent is extended or adjusted under 35 U.S.C. 154(b) by 706 days.

(21) Appl. No.: 17/607,827

(22) PCT Filed: Jun. 18, 2020

(86) PCT No.: PCT/IB2020/055689

§ 371 (c)(1),
(2) Date: Oct. 29, 2021

(87) PCT Pub. No.: WO2020/261055

PCT Pub. Date: Dec. 30, 2020

(65) Prior Publication Data

US 2023/0310522 A1 Oct. 5, 2023

(30) Foreign Application Priority Data

Jun. 24, 2019 (IT) ........................ 102019000009951

(51) Int. Cl.

| | |
|---|---|
| ***A61K 35/747*** | (2015.01) |
| ***A61F 13/00*** | (2006.01) |
| ***A61P 17/02*** | (2006.01) |
| ***A61P 31/04*** | (2006.01) |
| ***C12N 1/20*** | (2006.01) |
| ***C12N 1/205*** | (2026.01) |
| *C12R 1/07* | (2006.01) |
| *C12R 1/23* | (2006.01) |
| *C12R 1/25* | (2006.01) |
| *C12R 1/46* | (2006.01) |

(52) U.S. Cl.

CPC ...... *A61K 35/747* (2013.01); *A61F 13/00063* (2013.01); *A61P 17/02* (2018.01); *A61P 31/04* (2018.01); *C12N 1/20* (2013.01); *C12R 2001/07* (2021.05); *C12R 2001/23* (2021.05); *C12R 2001/25* (2021.05); *C12R 2001/46* (2021.05)

(58) Field of Classification Search

CPC ............ A61K 35/747; A61F 13/00063; C12R 2001/07; C12R 2001/23; C12R 2001/25; C12R 2001/46; A61P 17/02; A61P 1/00; C12N 1/205

See application file for complete search history.

(56) References Cited

U.S. PATENT DOCUMENTS 9,308,227 B2 * 4/2016 Lang ..................... A23K 10/16

FOREIGN PATENT DOCUMENTS

| | | | | |
|---|---|---|---|---|
| CN | 105343133 A | | 2/2016 | |
| CN | 106922816 A | | 7/2017 | |
| CN | 107106480 A | | 8/2017 | |
| CN | 107208107 A | | 9/2017 | |
| CN | 109497517 A | | 3/2019 | |
| KR | 20130002534 A | | 1/2013 | |
| KR | 101919938 B1 | * | 2/2019 | ........... A61K 35/747 |
| KR | 20190060556 A | | 6/2019 | |
| WO | WO016124266 A1 | | 2/2008 | |
| WO | WO2011146715 A1 | | 11/2011 | |

OTHER PUBLICATIONS

Watts et al. 16S rRNA gene sequencing on a benchtop sequencer: accuracy for identification of clinically important bacteria. J Appl Microbiol. 2017;123(6):1584-1596.*
Park et al. Lactobacillus plantarum HAC01 regulates gut microbiota and adipose tissue accumulation in a diet-induced obesity murine model. Appl Microbiol Biotechnol. 2017; 101:1605-1614.*
Wang et al. Bacillus amyloliquefaciens SC06 alleviates the oxidative stress of IPEC-1 via modulating Nrf2/Keap1 signaling pathway and decreasing ROS production. Appl Microbiol Biotechnol. 2017; 101:3015-3026.*
Marseglia et al. Oxidative Stress in Obesity: A Critical Component in Human Diseases. Int. J. Mol. Sci. 2015;16:378-400.*
SEQ ID No. 4, GenBank Blast, cited in Park et al. Lactobacillus plantarum HAC01 regulates gut microbiota and adipose tissue accumulation in a diet-induced obesity murine model. Appl Microbiol Biotechnol. 2017; 101:1605-1614.*
SEQ ID No. 5, GenBank Blast, cited in Park et al. Lactobacillus plantarum HAC01 regulates gut microbiota and adipose tissue accumulation in a diet-induced obesity murine model. Appl Microbiol Biotechnol. 2017; 101:1605-1614.*
SEQ ID No. 6, GenBank Blast, cited in Park et al. Lactobacillus plantarum HAC01 regulates gut microbiota and adipose tissue accumulation in a diet-induced obesity murine model. Appl Microbiol Biotechnol. 2017;101:1605-1614.*
Salaran et al. Topical Application of Lactobacillus Plantarum on Burn Wound Healing in Diabetic Rats. IJVS. 2019;14(1):60-72.*
Komosinska-Vassev et al. Bee Pollen: Chemical Composition and Therapeutic Application. Evid Based Complement Alternat Med. 2015;2015:1-6.*
European Office Action dated Mar. 11, 2024 for European Application No. 20739770.4.

(Continued)

*Primary Examiner* — Lynn Y Fan
(74) *Attorney, Agent, or Firm* — Gregory P. Einhorn; Greer, Burns & Crain, Ltd.

(57) ABSTRACT

The present invention relates to the strain of *Lactobacillus plantarum* NCIMB 43029, the strain of *Lactobacillus acidophilus* NCIMB 43030, a composition with both antibacterial and re-epithelializing action which includes *Lactobacillus plantarum* and *Lactobacillus acidophilus* and optionally *Streptococcus thermophilus* and/or *Bacillus amyloliquefaciens* intended to be used as a medicament for the re-epithelialisation of lesions or wounds, a bandage comprising said composition and kits comprising such a composition.

10 Claims, 14 Drawing Sheets

Specification includes a Sequence Listing.

(56) References Cited

OTHER PUBLICATIONS

Chinese Office Action dated Mar. 26, 2024 for Chinese Application No. 202080045740.0.

Chinese Search Report dated Mar. 26, 2024 for Chinese Application No. 202080045740.0.

Matziouridou, C., et al., "iNOS- and NOX1-dependent ROS production maintains bacterial homeostasis in the ileum of mice", MucosalImmunology, Dec. 6, 2017, pp. 2-15.

Oh, C., et al., "Fermentation by Lactobacillus enhances anti-inflammatory effect of Oyaksungisan on LPS-stimulated RAW 264.7 mouse macrophage cells", Complementary and Alternative Medicine, (2012), pp. 1-10, vol. 12, No. 17.

Makarova K., et al., "Comparative genomics of the lactic acid bacteria", PNAS, Oct. 17, 2006, pp. 15611-15616, vol. 103, No. 42.

Japanese Office Action dated Jan. 30, 2024 for Japanese Application No. 2021-576640.

Caliceti C., et al., "Comparative Study and Antioxidant and Immunomodulant activities between yeast and lab fermented papaya", Functional Foods in Health and Disease, 2017, pp. 49-61, vol. 8, No. 1.

Barzegari, A., et al., "Effects of topical treatment of second-degree burn wounds with lactobacillus acidophilus on the wounds healing process in male rats", Pharmaceutical and Biomedical Research, 2017, pp. 23-30, vol. 3, No. 3.

Toumi et al., "Probiotic Bacterialactobacillus and Bifidobacterium Attenuate Inflammation in Dextran Sulfate Sodium-Induced Experimental Colitis in Mice" International Journal of Immunopathology and Pharmacology, vol. 27, No. 4, 615-627 (2014).

Labrie et al., "Complete Genome Sequence of *Streptococcus thermophilus* SMQ-301, a Model Strain for Phage-Host Interactions" Genome Announcements, 2015, v 3, n 3, p. 1-2.

Makarova et al., "*Streptococcus thermophilus* LMD-9, complete genome" EMBL 2014.

Lombardi et al., "Soluable fraction fro lysates of selected probiotic strains differently influences re-epitheliazation of HaCaT scratched monolayer through a mechanism involving nitric oxide synthase 2" Biomolecules, 2019, v 9 n 756, p. 1-14.

* cited by examiner

*L. plantarum* (10 µg/ml)

*L. acidophilus* (10 µg/ml)

*S. thermophilus* (10 µg/ml)

*B. amyloliquefaciens* (10 µg/ml)

*L. plantarum* (10 µg/ml) + *L. acidophilus* (10 µg/ml)

*L. plantarum* (10 µg/ml) + *L. acidophilus* (10 µg/ml) + *S. thermophilus* (10 µg/ml)

*L. plantarum* (10 µg/ml) + *L. acidophilus* (10 µg/ml) + *S. thermophilus* (10 µg/ml)

*L. plantarum* (10 µg/ml) + *L. acidophilus* (10 µg/ml) + *S. thermophilus* (10 µg/ml) + *B.amyloliquefacins* (10 µg/ml)

A

Day 36

B

Day 36

Day 48

Day 48

Day 57

Day 57

Day 170

Day 170

SEQUENCE LISTING

```
<160> NUMBER OF SEQ ID NOS: 10

<210> SEQ ID NO 1
<211> LENGTH: 551
<212> TYPE: DNA
<213> ORGANISM: Lactobacillus acidophilus
<220> FEATURE:
<223> OTHER INFORMATION: Lactobacillus acidophilus NCIMB43030 -
      hypervariable regions V1-V3 of the gene codifying for 16S rRNA

<400> SEQUENCE: 1

agagtttgat cctggctcag gacgaacgct ggcggcgtgc ctaatacatg caagtcgagc     60

gagctgaacc aacagattca cttcggtgat gacgttggga acgcgagcgg cggatgggtg    120

agtaacacgt ggggaacctg ccccatagtc tgggatacca cttggaaaca ggtgctaata    180

ccggataaga aagcagatcg catgatcagc ttataaaagg cggcgtaagc tgtcgctatg    240

ggatggcccc gcggtgcatt agctagttgg tagggtaacg gcctaccaag gcaatgatgc    300
```

```
atagccgagt tgagagactg atcggccaca ttgggactga gacacggccc aaactcctac    360

gggaggcagc agtagggaat cttccacaat ggacgaaagt ctgatggagc aacgccgcgt    420

gagtgaagaa ggttttcgga tcgtaaagct ctgttgttgg tgaagaagga tagaggtagt    480

aactggcctt tatttgacgg taatcaacca gaaagtcacg gctaactacg tgccagcagc    540

cgcggtaata c                                                         551


<210> SEQ ID NO 2
<211> LENGTH: 1629
<212> TYPE: DNA
<213> ORGANISM: Lactobacillus acidophilus
<220> FEATURE:
<223> OTHER INFORMATION: Lactobacillus acidophilus NCIMB43030 - gene
      groEL

<400> SEQUENCE: 2

atggcaaaag atattaaatt cgcagaaaac gcaagacgtt ctcttttaaa gggtgttgac     60

aagttagctg ataccgttaa gactactatt ggtcctaagg gtagaaacgt tgttttggaa    120

caaagttacg gcaacccaga cattactaat gatggtgtta ctattgctaa gtcaattgaa    180

ttaaaagacc attacgaaaa catgggtgct aagcttgttg ctgaagctgc acaaaagact    240

aacgacattg ccggtgacgg tactactact gcaactgttt tgactcaagc aattgctcgt    300

gaaggtatga agaacgttac tgctggtgct aaccctgtag gcattcgtcg cggtattgaa    360

aaggcaacta aggctgctgt tgatgaatta cacaagatta gccacaaggt tgaatcaaag    420

gaacaaattg ctaacgtagc tgctgtttct tcagcatcta aagaagttgg tgaattgatc    480

gctgacgcta tggaaaaggt tggtcacgat ggtgttatta ctatcgaaga ttcacgtggt    540

atcaatactg aactttcagt agttgaaggt atgcaattcg atcgtggtta cttgtcacaa    600

tacatggtaa ctgacaacga caagatggaa gcagaccttg ataacccata catcttgatt    660

actgacaaga agatttcaaa tattcaagac atcttgccac ttcttcaaga aatcgttcaa    720

caaggtaagt cattattgat cattgctgac gatgttactg gtgaagctct tccaactctt    780

gttttgaaca agattcgtgg tactttcaac gttgtagctg ttaaggcacc tggttttggt    840

gaccgtcgta aagctcaact tgaagacatt gcagccctta ctggtggtac agtaattacc    900

gatgacttag gctttgaatt aaaggacact aagattgatc aattaggtca agcacgtcgt    960

gtaactgtaa ctaaggactc aactactatt gttgacggtg ctggttcaaa ggacgctatt   1020

aaggaacgcg aagattcaat tagaaaacaa attgaagaat caacttcaga cttcgacaag   1080

aagaagttac aagaacgtct tgcaaaactt actggtggtg tggctgttat ccacgtaggt   1140

gctgctactg aaactgaact taaggaacgt cgttacagaa tcgaagatgc tttgaactca   1200

actcgtgccg ctgttgatga aggctacgtt gccggtggtg gtactgcatt agttgatgtt   1260

gaaaaggcaa ttaaggacct taagggtgaa acatcagatg aacaaactgg tatcaacatt   1320

gttttaagag cattatcagc acctgtacgt caaattgctg aaaacgctgg taaagacggt   1380

gcagttgtat tgaacaagct tgaaagccaa gaaaacgaaa ttggttacaa tgctgcaact   1440

gataagtggg aaaacatggt tgaagctggt atcatcgacc caactaaggt aactcgtact   1500

gctttgcaaa atgctgcttc aattgctgct cttcttctta caactgaagc tgttgttgca   1560

gatattcctg aagataagcc agaagctcct caagcaggtg cagctggtgc tccaggtatg   1620

ggtatgtaa                                                           1629
```

```
<210> SEQ ID NO 3
<211> LENGTH: 1050
<212> TYPE: DNA
<213> ORGANISM: Lactobacillus acidophilus
<220> FEATURE:
<223> OTHER INFORMATION: Lactobacillus acidophilus NCIMB43030 - gene
      pheS

<400> SEQUENCE: 3

atggacttat ttgataagtt aaaagagctt catgaagaag gacttaagca aatcagtaaa     60

gctactgatg aaaagacttt gaatgaagta agagtcgaac ttgttggtcg taagggtgaa    120

ttaactaaga ttttgcactc aatgcgtgat gttgcaccag aaaatagacg tgaagtgggt    180

caaaaagtta atgaattgcg tgatttgttt aatgcccaat tagacgaagc aaaggaaaac    240

attgttaaag cagttttagc taaacgactt gaagaagaaa aaattgatgt tactttgcca    300

ggtcgtgaag ggcatttggg ctccaagcac ccaattaata tcatcttgga tgatcttgaa    360

agttatttca ttggtatggg ttacaaagtt gtacaaggtc cagaaattga aacagatcac    420

tatgtctttg aaatgatgaa cttaccaaag gatcacccag ctcgtgatat gcaagctact    480

ttctacatta atgatgaaaa cttgcttaga tctcaaactt caggtgacca agctcgtgtg    540

cttgaaaagc atgacttctc aaagggtcct cttaagatgg ttggtcctgg taaggtatac    600

cgtcgtgatg acgatgatgc gactcactct caccaattta tgcaaatgga agggttagtt    660

attgacaagc acgttactat gagcgattta aagggtactt tggaaatgat cgctaagcac    720

gtatttgggc aagatagagc aacccgttta cgtccaagtt atttcccctt cactgaacca    780

tctgtagaaa tggatgtatc ttgttttaat tgtgatggta aaggttgtcc aatttgtaaa    840

tacactggtt ggattgaagt attaggtgct ggtatggttc accctaatgt tttagaaaat    900

gctggtgttg attcaaacgt ttacggtggt tttgccttcg gtgtaggact tgatcgtttc    960

gcaattttga aatacggcat tgatgatatt cgtgacttct acacaaacga tgttcgtttc   1020

ttagaacaat tccgcaagga ggaaaagtaa                                    1050


<210> SEQ ID NO 4
<211> LENGTH: 553
<212> TYPE: DNA
<213> ORGANISM: Lactobacillus plantarum
<220> FEATURE:
<223> OTHER INFORMATION: Lactobacillus plantarum NCIMB43029 -
      hypervariable regions V1-V3 of the gene codifying for 16S rRNA

<400> SEQUENCE: 4

gtattaccgc ggctgctggc acgtagttag ccgtggcttt ctggttaaat accgtcaata     60

cctgaacagt tactctcaga tatgttcttc tttaacaaca gagttttacg agccgaaacc    120

cttcttcact cacgcggcgt tgctccatca gactttcgtc cattgtggaa gattccctac    180

tgctgcctcc cgtaggagtt tgggccgtgt ctcagtccca atgtggcyga ttaccctctc    240

aggtcggcta cgtatcattg ccatggtgag ccgttacccc accatctagc taatacgccg    300

cgggaccatc caaaagtgat agcygaagcc atctttcaar ctcggaccat gcggtccaag    360

ttgttatgcg gtattagcat ctgtttccag gtgttatccc ccgcttctgg gcaggtttcc    420

cacgtgttac tcaccagttc gccactcact caaatgtaaa tcatgatgca agcaccaatc    480

aataccagag ttcgttcgac ttgcatgtat taggcacgcc gccagcgttc gtcctgagcc    540

aggatcaaac tct                                                       553


<210> SEQ ID NO 5
```

<211> LENGTH: 1626
<212> TYPE: DNA
<213> ORGANISM: Lactobacillus plantarum
<220> FEATURE:
<223> OTHER INFORMATION: Lactobacillus plantarum NCIMB43029 - gene groEL

<400> SEQUENCE: 5
atggctaaag aattaaagtt ctctgaagat gcacgttcag cgatgctaaa aggtgtcgat 60
caattagctg acacagttaa gtcaacgtta ggtcctaagg gtcgcaacgt tgttttggaa 120
caatcatatg gttcaccaac aattactaat gatggtgtaa cgattgctaa ggcgatcgaa 180
ttagacgatc atttcgaaaa catgggtgct aagttagttt ctgaagttgc ttcaaagact 240
aatgacatcg ctggtgatgg gacgactact gcaacggtct taacacaatc aatcgttaat 300
gaaggtatga agaacgttac ggccggtgct aaccctgttg gcattcgtcg tgggattgaa 360
gaagctacta agacggcggt tgactcatta cacgctatgg cacacgaagt taagacgcaa 420
gaagatattg cgcaaatcgc ttctgtatct tcagcaagtg aagaaactgg taaattgatt 480
gccgaagcca tggaaaaagt tggtcatgac ggtgttatca cgattgaaga atcacgtggt 540
gttgatacta gcttagacgt tgttgaaggg atgcaattcg accgcggcta cttatcacaa 600
tacatggtta ctgataatga taagatggaa gcggatcttg acaatccata tatcttaatt 660
actgataaga agatttcaaa cattcaagat atcttaccac tattacaatc catcgttgaa 720
caaggcaagc cattgttgat cattgctgat gacatttctg gtgaagcttt accaacctta 780
gtcttgaaca agatgcgtgg gacgtttaac gttgtcgccg ttaaggcacc cggttttggt 840
gatcggcgta aggaacaatt acaagatatc gctatcttaa ctggcgggac ggttatcact 900
gacgaccttg gccttgaatt gaaggacacg accatcgatc aattaggtca agccaacaaa 960
gttacggtta ctaaggataa caccaccatt gttgaaggcg ctggttccaa ggatgctatc 1020
tcagaacggg ttgaatttat ccgtaaccaa atcggtgaaa caacttctga ctttgacaaa 1080
gaaaagttac aagaacgttt agctaaatta gctggtgggg ttgccgttgt tcgtgtcggt 1140
gccgctactg aaactgaatt gaaggaacgt aaataccgga ttgaagatgc tttgaacgca 1200
actcgggccg ccgttgaaga aggctttgtt gctggtggtg gtactgcttt gattaacgtt 1260
atcaaagatg ttgctgcatt gaaggaaact ggtgacgttc aaactgggat caacattgtt 1320
aaacgtgctt tggaagaacc agttcgccaa atcgctgaaa atgctggttt ggaaggctct 1380
gttatcgttg aaaaaatgaa ggaacaaaag ccaggtgttg gtttcaacgc cgcaactgat 1440
gaatgggttg acatgatcaa agctggtatc gtggacccaa ctaaggtaac gcgttctgct 1500
ttacaaaatg ccgcttctgt ttcagccctt ctcttaacga ctgaagccgt tgtcgctgaa 1560
aaacctgaag aaaatgcacc agctgcacca gccgcaccaa acccaggtat gggcggtatg 1620
atgtaa 1626

<210> SEQ ID NO 6
<211> LENGTH: 1047
<212> TYPE: DNA
<213> ORGANISM: Lactobacillus plantarum
<220> FEATURE:
<223> OTHER INFORMATION: Lactobacillus plantarum NCIMB43029 - gene pheS

<400> SEQUENCE: 6
atgagtttac aagatcgatt aaccgaatta cgcgatcaag gcttggccga tattaaatcc 60
gccgatgttt tgaaaaaggt taaccaagtc aaagttgatt tgcttggtaa aaagggtccg 120
attacagaag tattgcgcgg aatgcgcgac ttaagcccgg aagaacggcc aaaggtgggc 180
gcttatgcca acgaagttcg tgaccggatt caggctgcga ttgatgaacg ccgtgaagaa 240
ctggaacaag cagccgttaa tgagcaattg gctgccgaaa aactggacgt gacgttaccg 300
ggtcgggaag ttccacaagg tcagcctcac gtgattaccc agattattac tgaattggaa 360
gatctattta tgggaatggg ctatcaaatt gttgatggtg atgaagttga agaagattac 420
tacaactttg aacggttgaa cttaccgaag gaccatcccg cccgtgacat gcaagacacg 480
ttctatatta ccaaagacgt gctactacgc acgcagacgt ctgctgatca gccgcggtca 540
cttgaaaatc acgatttttc taaaggaccg ctgaaggtct tgtcacctgg ccgcgtttat 600
cggcgtgata cggatgatgc aacccattcc catcaatttc atcaaattga agggttagtc 660
gtggacaagc atattacgat ggctgatttg aagggcacct taattctggt tgccaagact 720
ttgtttggcg atcaattcga tgttcggcta cggccaagct tctttccatt cacggaacca 780
tccgtagaag ctgatgtaac ttgctttaat tgcaatggca agggctgtgc aatctgtaag 840
caaacgggtt ggatcgaagt actgggtgcc ggcatggttc acccccacgt gttagaaatg 900
tctggcattg atccagaaga atatggtggt tttgcctttg ggttaggacc agaccgcttt 960
gcaatgttga aatacggtgt tgacgatatc cgcaacttct acttgaatga cgtgcggttc 1020
ttgtcacagt tctataagaa aggttag 1047

<210> SEQ ID NO 7
<211> LENGTH: 403
<212> TYPE: DNA
<213> ORGANISM: Streptococcus thermophilus
<220> FEATURE:
<223> OTHER INFORMATION: Streptococcus thermophilus - hypervariable regions V1-V2 of the gene codifying for 16S rRNA

<400> SEQUENCE: 7
cggcgttgct cggtcagggt tgcccccatt gccgaagatt ccctactgct gcctcccgta 60
ggagtctggg ccgtgtctca gtcccagtgt ggccgatcac cctctcaggt cggctatgta 120
tcgtcgccta ggtgagccat tacctcacct actagctaat acaacgcagg tccatcttgt 180
agtggagcaa ttgccccttt caaataaatg acatgtgtca tccattgtta tgcggtatta 240
gctatcgttt ccaatagtta tcccccgcta caaggcaggt tacctacgcg ttactcaccc 300
gttcgcaact catccaagaa gagcaagctc ctctcttcag cgttctactt gcatgtatta 360
ggcacgccgc cagcgttcgt cctgagccag gatcaaactc tca 403

<210> SEQ ID NO 8
<211> LENGTH: 1140
<212> TYPE: DNA
<213> ORGANISM: Streptococcus thermophilus
<220> FEATURE:
<223> OTHER INFORMATION: Streptococcus thermophilus - gene recA

<400> SEQUENCE: 8
gtggctaaga aaacaaagaa aacagaagaa atcacaaaga agtttggtga tgagcgtcgc 60
aaagcactcg acgatgcatt aaaaaacatt gaaaaagatt ttggtaaggg tgcagttatg 120
cgtcttggtg agcgtgcaga gcaaaaagtt caggttatga gctcaggctc actagctttg 180
gatattgctc ttggtgcggg tggttaccct aaaggtcgta ttattgaaat ttacggacca 240
gaatcatcag gtaaaacaac tgttgccctt catgcagttg ctcagactca aaaagaaggt 300
ggcatcgcag cttttatcga tgccgagcat gctcttgacc ctgcgtatgc agcagctcta 360
ggtgttaata tcgatgagct tcttttgtcg cagcctgatt ctggtgagca aggtctcgaa 420
attgcaggta agctgattga ctctggtgca gtggatttag ttgttgttga ctcagttgcg 480
gccttggtac cacgtgcaga aattgatgga gatattggtg acagtcatgt aggacttcaa 540
gcgcgtatga tgagtcaagc catgcgtaaa ctttctgcat ctattaataa aacaaaaacg 600
attgctatct ttattaacca gttgcgtgaa aaagttggta tcatgtttgg taacccagag 660
actaccccag gtggacgtgc tttaaaattc tatgcatcag tacgtcttga tgtacgtggt 720
aatacacaaa ttaaaggaac cggtgacaaa aaggaccaaa atgttggtaa ggaaaccaag 780
attaaggttg ttaaaaacaa agttgctcca ccatttaaag aagcttttgt tgaaattatg 840
tatggcgaag gaatttcaca aaccggtgaa cttgtaaaaa ttgcaagtga tataggcatt 900
attcagaaag ccggagcttg gttctcatat aatggggaga aaattggtca aggatctgaa 960
aatgctaaaa agtatttagc agatcaccct gagatttttg cagaaatcga tcataaagta 1020
cgcgtacact acggtctgat tgagctagat gaggacgatg ttgttgaaga tacacaagtt 1080
gaagacacgt ctgatgaact cattctagat cttgattcaa ccattgaaat cgaagaataa 1140

<210> SEQ ID NO 9
<211> LENGTH: 2550
<212> TYPE: DNA
<213> ORGANISM: Streptococcus thermophilus
<220> FEATURE:
<223> OTHER INFORMATION: Streptococcus thermophilus - gene secA

<400> SEQUENCE: 9
atggcaaata tattacgcaa aatcattgaa aatgataagg gcgaaattaa aaaactagaa 60
aaaactgcca agaaagttga gagctatgct gatgcaatgg cggctctttc agatgaagaa 120
cttcaggcaa aaacagaaga atttaaacaa cgatatcaaa acggagaaag tctagatcag 180
ctcttgccgg aggcatttgc ggttgttcgt gagggagcga aacgtgtcct tggacttttc 240
ccatatcgtg tgcaaattat gggtggtatt gtgcttcact atggtgacgt agcggagatg 300
cgtacagggg aagggaaaac ccttactgcg acaatgcctg tctacttgaa tgctatttca 360
ggtgaaggtg tacacgttat caccgttaac gaatacctttt cagagcgtga tgcgactgaa 420
atgggtgagc tttatagttg gctcggtttg tcagtaggga tcaacctttc atctaaatca 480
ccagctgaaa aacgtgaagc ttataattgt gacatcactt actcaaccag ctcagaggta 540
ggtttcgact atcttcgtga taatatggtt gttcgtaagg aaaacatggt acaacgccca 600
ttgaactttg ccttggtcga tgaggttgac tcggttctta ttgatgaagc tcgtacacca 660
ttgatcgtat cagggcctgt aagttcagaa actaatcagt tgtatcaccg tgcggatgct 720
tttgttaaga cattgactga agatgattat gcgattgata ttccaacaaa aacaattggt 780
ttgaatgact caggtattga caaggctgaa gagttcttca acttggaaaa tttgtacgat 840
attgacaatg ttgccttgac tcactatatt gacaatgccc ttcgtgccaa ctacattatg 900
ttgcgtgata ttgactacgt ggtaagtcct gagcaagaaa tccttattgt tgaccaattt 960
actggtcgta ccatggaagg tcgtcgtttt tcagatgggc tccaccaagc cattgaggct 1020
aaagaaggtg taccagtcca agaggaaacc aagacttctg cctcaatcac ttaccaaaat 1080
atgttccgta tgtacaagaa attgtcaggt atgactggta ctggtaagac tgaagaggat 1140
gaattccgtg aaatctataa catgcgagtc atcccaattc caacaaaccg tccaattcaa 1200
cgtattgacc atgatgacct tctgtactca actttggatg ctaaattccg tgctgtggta 1260
caagatgtta agcgtcgtta tgagaagggg caaccagttc ttattggtac ggttgccgtt 1320

```
gaaacatctg acttgatttc taagatgttg gttgacgcag gtattcctca cgaggtgctt   1380

aatgccaaga accacgaaaa agaagcgcat attatcatga atgcaggtca acgtggtgct   1440

gttacgattg cgaccaatat ggccggtcgt ggtactgaca tcaaacttgg tgaaggtgtt   1500

ctggagcttg gtggactttg tgtcattggt acagagcgtc atgaaagtcg tcgtatcgac   1560

aaccagttgc gtggtcgttc gggacgtcaa ggggatccag gggagtctca attctaccta   1620

tctcttgaag acgaattgat gcgtcgtttc ggttctgacc gtatcaagca tgtcttggaa   1680

cgtttgaacg ctgatgacga agatattgtt atcaaatcac gtatgttgac ccgtcaagtg   1740

gaatcagctc aaaaacgtgt cgaagggaat aactacgata ctcgtaaaca agttcttcag   1800

tacgatgacg ttatgcgtga acagcgtgaa atcatctacg ctgagcgtta tgatgttatt   1860

acagcagaac gtgaccttga acctgaaatc aaggctatga tcaagcgtac tattaaccgt   1920

acggttgatg gacacagtcg taacgatcaa gaagaagctc ttaaaggtat cttgaacttt   1980

gcacgtcagg ccttggttcc tgaggatgcc atctcgcttg aagatctaaa agaagtggga   2040

gaggtgacta aacgtagtgt taattatgat gctatcaagg tttatctgac tgagttagca   2100

gataatgttt atgatcgtca aattaagaaa ttgcgttcag aggaggctat tcgcgaattc   2160

caaaaagtct tgattttgat ggttgttgat aataagtgga cagaccacat tgatgccctt   2220

gatcaattac gtaacgccgt tggtatgcgt ggttatgcgc aaaacaaccc aatcgttgag   2280

tatcaatctg aaagtttcaa gatgttccaa gatatgattg gtgctattga gtatgatgta   2340

actcgtacga tgatgaaagc acaaatccac gaacaatctc gtgaacatgt taatgaacgt   2400

gtttcaacaa cagcaacagg caatattcaa gcacatcaag cagatgctaa cggtcaagag   2460

attgacttta gcaaggttgg tcgtaatgac ttctgtccat gtggctctgg taagaaattc   2520

aaaaattgtc acggtcgtaa acagttttag                                    2550
```

<210> SEQ ID NO 10
<211> LENGTH: 1438
<212> TYPE: DNA
<213> ORGANISM: Bacillus amyloliquefaciens
<220> FEATURE:
<223> OTHER INFORMATION: Bacillus amyloliquefaciens - gene codifying the 16S rRNA

<400> SEQUENCE: 10

```
gggggctgct aagctgcaag tcgagcgggc agatgggagc ttgctccctg atgttagcgg     60

cggacgggtg agtaacacgt gggtaacctg cctgtaagac tgggataact ccgggaaacc    120

ggggctaata ccggatggtt gtctgaaccg catggttcag acataaaagg tggcttcggc    180

taccacttac agatggaccc gcggcgcatt agctagttgg tgaggtaacg gctcaccaag    240

gcgacgatgc gtagccgacc tgagagggtg atcggccaca ctgggactga gacacggccc    300

agactcctac gggaggcagc agtagggaat cttccgcaat ggacgaaagt ctgacggagc    360

aacgccgcgt gagtgatgaa ggttttcgga tcgtaaagct ctgttgttag ggaagaacaa    420

gtgccgttca aatagggcgg caccttgacg gtacctaacc agaaagccac ggctaactac    480

gtgccagcag ccgcggtaat acgtaggtgg caagcgttgt ccggaattat tgggcgtaaa    540

gggctcgcag gcggtttctt aagtctgatg tgaaagcccc cggctcaacc ggggagggtc    600

attggaaact ggggaacttg agtgcagaag aggagagtgg aattccacgt gtagcggtga    660

aatgcgtaga gatgtggagg aacaccagtg gcgaaggcga ctctctggtc tgtaactgac    720

gctgaggagc gaaagcgtgg ggagcgaaca ggattagata ccctggtagt ccacgccgta    780
```

-continued

```
aacgatgagt gctaagtgtt agggggtttc cgccccttag tgctgcagct aacgcattaa    840
gcactccgcc tggggagtac ggtcgcaaga ctgaaactca aaggaattga cgggggcccg    900
cacaagcggt ggagcatgtg gtttaattcg aagcaacgcg aagaacctta ccaggtcttg    960
acatcctctg acaatcctag agataggacg tccccttcgg gggcagagtg acaggtggtg   1020
catggttgtc gtcagctcgt gtcgtgagat gttgggttaa gtcccgcaac gagcgcaacc   1080
cttgatctta gttgccagca ttcagttggg cactctaagg tgactgccgg tgacaaaccg   1140
gaggaaggtg gggatgacgt caaatcatca tgccccttat gacctgggct acacacgtgc   1200
tacaatggac agaacaaagg gcagcgaaac cgcgaggtta agccaatccc acaaatctgt   1260
tctcagttcg gatcgcagtc tgcaactcga ctgcgtgaag ctggaatcgc tagtaatcgc   1320
ggatcagcat gccgcggtga atacgttccc gggccttgta cacaccgccc gtcacaccac   1380
gagagtttgt aacacccgaa gtcggtgagg taacctttag gagccagccg ccgaaggt     1438
```

COMPOSITION WITH ANTIBACTERIAL AND RE-EPITHELIALIZING ACTION INCLUDING PROBIOTICS

This application is a national phase application claiming benefit of priority under 35 U.S.C. § 371 to Patent Convention Treaty (PCT) International Application serial number PCT/IB2020/055689, filed Jun. 18, 2020, now pending, which claims the benefit of priority to Italian patent No. 102019000009951, filed on Jun. 24, 2019. The aforementioned applications are expressly incorporated herein by reference in their entirety and for all purposes.

TECHNICAL FIELD

The present invention relates to the strain of *Lactobacillus plantarum* NCIMB 43029, the strain of *Lactobacillus acidophilus* NCIMB 43030, a composition with both antibacterial and re-epithelializing action, which includes *Lactobacillus plantarum* and *Lactobacillus acidophilus* and optionally *Streptococcus thermophilus* and/or *Bacillus amyloliquefaciens*, said composition for use as a medicinal product, in particular in a re-epithelialization process of a lesion or wound, and a bandage or kit comprising said composition.

PRIOR ART

Success in skin regeneration is a major challenge as lesion or wound healing is a highly dynamic and complex process which involves many phases starting with hemostasis and coagulation phases, with the formation of a temporary wound matrix, followed by the phases of inflammation, re-epithelialization and remodeling of the tissue in reconstitution.

The difficulty of healing a lesion or a wound increases when the lesion or wound become chronic.

One of the problems most commonly associated with the wound healing process is represented by the possibility that the wound will become infected. Open wounds, particularly chronic wounds, present a high risk of colonization by pathogens. In particular, the wound bed presents an ideal environment for the proliferation of bacteria which, due to the presence of permissive conditions such as the reduced blood circulation and the low oxygen availability, can colonize the wound bed to form multicellular aggregates which adhere to the surface through particular structures defined biofilms. Biofilm is constituted by an extracellular polysaccharide matrix allowing microbial aggregates embedded in said matrix to form. Said structures are present in 60% of chronic and 6% of acute lesions or wounds.

Biofilm is a microbial colonization factor which not only allows a strong adhesion of micro-organisms to a large range of biotic and abiotic surfaces but, by enveloping the microbial aggregate, allows the latter to be protected against antimicrobial agents such as antibiotics and disinfectants, facilitating in addition the spread of the infection. In these conditions, the bacterial infection is difficult to eradicate, often requiring the removal of the affected tissue or the administration of high doses of antimicrobials such as antibiotics and antiseptics.

Even if the administration of antibiotics for oral and topical use is an efficient therapeutic strategy, it is one of the main causes of the onset of resistance phenomena which pose serious problems to the treatment of infected lesions/wounds, thus hindering their healing. As to the use of topical antiseptics, it should be noted that they often present a high aggressiveness associated, in many cases, with damage of the epithelial area where these substances are applied.

In order to be able to act on the wound healing it is necessary to understand the biochemical aspect of the process.

As it is known, nitric oxide (NO) plays a key role in the healing process of lesions or wounds and in particular in their re-epithelialization and cicatrization. Nitric oxide is produced by inducible nitric oxide synthase (iNOS). In particular, nitric oxide is a biological mediator that affects all phases of the wound healing process and acts on all cell types involved in the process.

Although the use of probiotics in the treatment of skin changes has been studied, the results obtained do not appear unambiguous and/or fully satisfying.

In particular, the identification of probiotics or compositions containing probiotics that exert both a relevant antibacterial effect and an effective re-epithelialization effect (especially mediated by iNOS) in tissues with lesions or wounds is a goal still to be achieved.

Probiotics particularly suitable for use in the treatment of a lesion or wound and having both a significant antibacterial effect and an effective re-epithelializing effect as well as compositions suitable for use in the treatment of lesions or wounds and that are at the same time free of side effects and gentle to the area of application requiring re-epithelialization as well as easy to set up and inexpensive are therefore needed.

SUMMARY

The inventor has surprisingly found that the *Lactobacillus plantarum* NCIMB 43029 strain which includes the hypervariable regions V1-V3 of the gene encoding for the 16S rRNA of SEQ ID NO: 4, the groEL gene of SEQ ID NO: 5 and the pheS gene of SEQ ID NO: 6, the *Lactobacillus acidophilus* NCIMB 43030 strain which includes the hypervariable regions V1-V3 of the gene encoding for the 16S rRNA of SEQ ID NO 1, the groEL gene of SEQ ID NO: 2 and the pheS gene of SEQ ID NO: 3, and *Streptococcus thermophilus* significantly increase the expression and activation of iNOS and thus the levels of nitric oxide (NO), with a high positive effect on the re-epithelialization of lesions and wounds, while also exerting an important antibacterial activity.

In addition, the inventor of the present invention has found a composition containing probiotics showing both antibacterial and re-epithelializing action, which allows to overcome all the disadvantages of the compositions of the prior art and which, in particular, shows not only to have an efficient antibacterial and re-epithelializing effect, but also to be free from side effects, gentle on the area of application, easy to set up and inexpensive.

Said composition is particularly effective in the treatment of lesions or wounds difficult to heal, in particular of wounds in which a biofilm of pathogenic bacteria, possibly resistant to antibiotics, is present.

A first object of the present invention is the strain of *Lactobacillus plantarum* deposited on Apr. 20, 2018 at the NCIMB Ltd. storage centre with access number 43029 which includes the hypervariable regions V1-V3 of the gene encoding for the 16S rRNA of SEQ ID NO: 4, the groEL gene of SEQ ID NO: 5 and the pheS gene of SEQ ID NO: 6 (hereinafter *Lactobacillus plantarum* NCIMB 43029).

A second subject of the present invention is the strain of *Lactobacillus acidophilus* deposited on Apr. 20, 2018 at the NCIMB Ltd storage centre with access number 43030 which includes the hypervariable regions V1-V3 of the gene encoding for the 16S rRNA of SEQ ID NO: 1, the groEL gene of SEQ ID NO: 2 and the pheS gene of SEQ ID NO: 3 (hereinafter *Lactobacillus acidophilus* NCIMB 43030).

Said probiotics, as previously pointed out, activate or induce the expression of iNOS. A further object of this invention is therefore the strain of *Lactobacillus plantarum* NCIMB 43029 and/or the strain of *Lactobacillus acidophilus* NCIMB 43030 as previously defined for use as medicaments.

An object of this invention is also the strain of *Lactobacillus plantarum* NCIMB 43029 and/or the strain of *Lactobacillus acidophilus* NCIMB 43030 as previously defined in the activation or the induction of iNOS expression.

An object of this invention is further the strain of *Lactobacillus plantarum* NCIMB 43029 and/or the strain of *Lactobacillus acidophilus* NCIMB 43030 as previously defined for use in the re-epithelialization of a lesion or wound and/or for use as antibacterials.

It has been also surprisingly found that a composition comprising *Lactobacillus plantarum* and *Lactobacillus acidophilus* exerts a combined powerful antibacterial and re-epithelializing action, and can be used in the treatment of lesions or wounds.

A further object of the present invention is therefore a composition with both antibacterial and re-epithelializing action, which includes *Lactobacillus plantarum* and *Lactobacillus acidophilus.*

In one aspect of the present invention, said composition includes the strain of *Lactobacillus plantarum* NCIMB 43029 as previously defined and/or the strain of *Lactobacillus acidophilus* NCIMB 43030 as previously defined.

In a further aspect of the present invention, said composition further includes at least one strain of the *Streptococcus thermophilus* species which is able to highly markedly increase the expression and activation of iNOS and thus the levels of nitric oxide (NO), and/or at least one strain of the *Bacillus amyloliquefaciens* species which is able to exert a antifungal activity.

In a preferred embodiment, the *Streptococcus thermophilus* includes the hypervariable regions V1-V2 of the gene encoding for the 16S rRNA of SEQ ID NO: 7, the recA gene of SEQ ID NO: 8 and the secA gene of SEQ ID NO: 9.

In a further preferred embodiment, the *Bacillus amyloliquefaciens* strain is the known strain characterized by SEQ ID NO: 10 encoding for the 16S rRNA.

A further object of the present invention is a composition according to the present invention for use as a medicament, in particular in a process of re-epithelialization of a lesion or a wound.

A preferred aspect of the present invention is a composition according to this invention for use in a re-epithelialization process of a lesion or a wound by the activation or the induction of iNOS expression.

A further object of the present invention is a bandage comprising a composition according to the present invention.

A further object of the present invention is a bandage comprising a composition according to the present invention, said bandage being for use as medicament, in particular in a re-epithelialization of a lesion or a wound.

A further object of the present invention is a kit which includes a sterile compressible container or a sterile single- or multi-dose pump containing a composition according to the present invention and the corresponding package leaflet.

DESCRIPTION OF THE DRAWINGS

FIG. 1(A) graphically illustrates the effects of bacterial extracts, at the concentration of 50 μg/ml, on the wound closure rate (% with respect to the corresponding T0) of scratched monolayers at 20 and 28 hours. The data are expressed as mean±SEM of three independent experiments conducted in duplicate. The two-way analysis of variance (ANOVA) followed by Dunnett's post-hoc test has been used for the comparative analysis of the data groups. *P<0.05, P<0.01, *P<0.001, **P<0.0001 with respect to the control (untreated), and FIG. 1**(B) illustrates images representing a re-epithelialisation of the mono-layer of HaCaT cells untreated (control) or treated with a bacterial extract (50 μg/ml) at 20 and 28 hours after the wound production (magnification 10×).

Figure 2A:
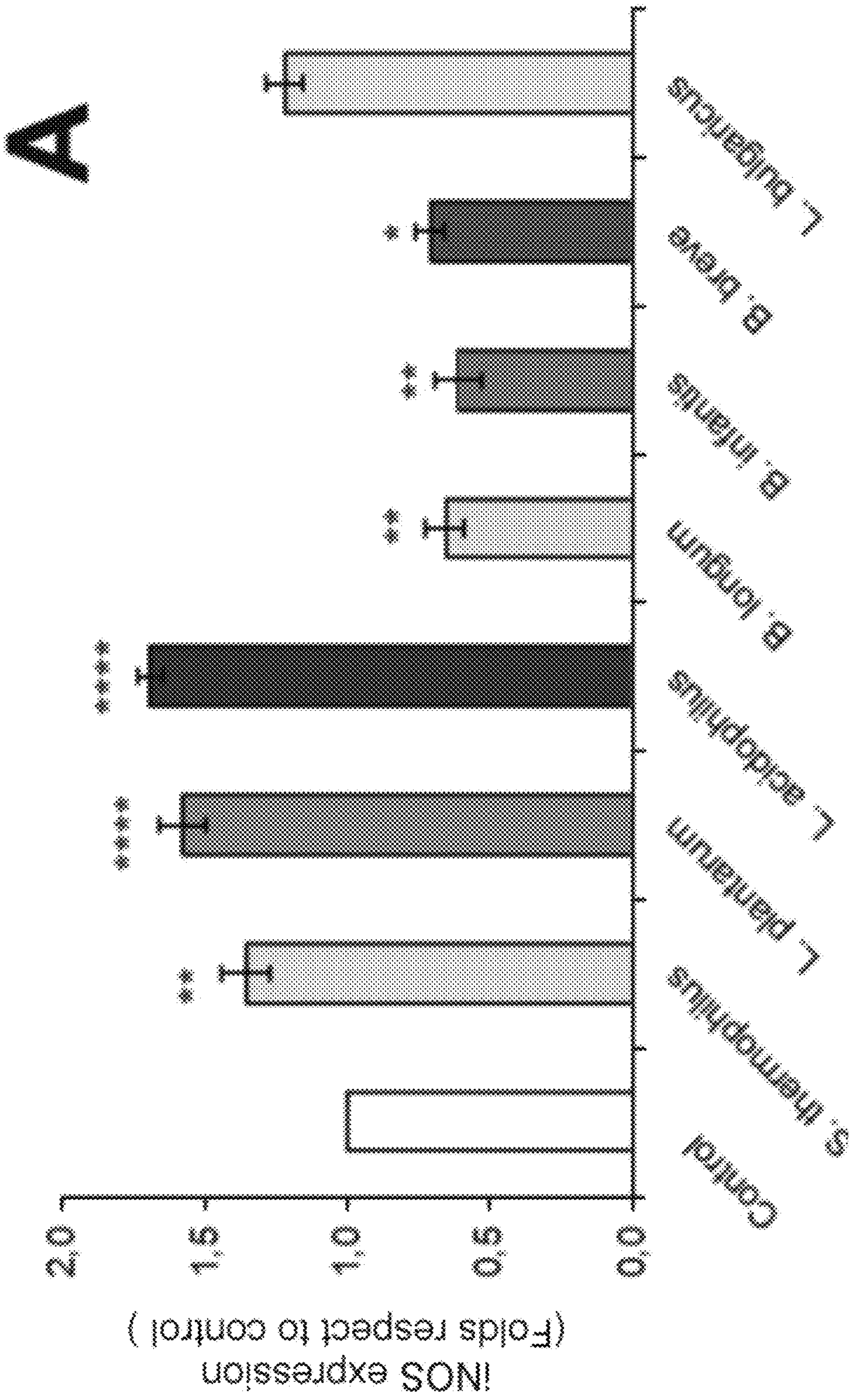
FIG. 2A-B illustrate the influence of the probiotic extracts on iNOS levels in scratched keratinocyte monolayers.

Immunoblot assays for the iNOS were performed on scratched monolayers treated with 50 μg/ml of probiotic extracts for 28 hours. The values resulting from the densitometric analysis of the bands were normalized with respect to those concerning β-actin and compared with the untreated controls;

FIG. 2(A) graphically illustrates Densitometry results expressed as iNOS/β-actin (fold with respect to control).

Data are derived from three independent experiments conducted in duplicate, while the values are expressed as mean±SEM. The one-way analysis of variance (ANOVA) followed by Dunnett's post-hoc test has been used to assess the presence of statistically significant differences between the data groups. *P<0.05, *P<0.01, P<0.0001 with respect to the control (untreated); and FIG. 2**(B) illustrates an image representing the immunoblots for the iNOS is shown.

Figure 3:
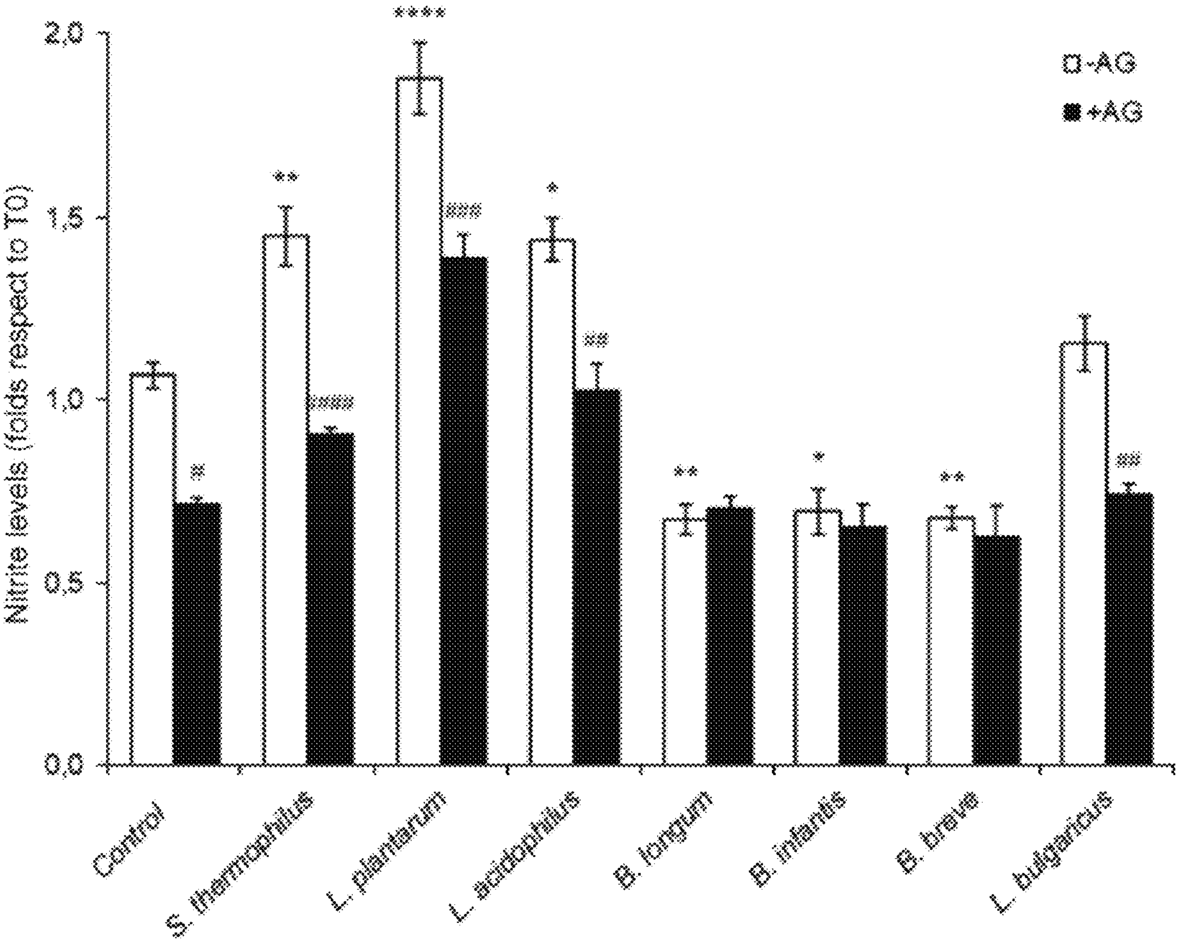

FIG. 3 graphically illustrates nitrate levels in the culture medium of scratched monolayers of HaCaT cells in presence or absence of aminoguanidine, AG, a iNOS inhibitor;

The scratched monolayers of HaCaT cells were incubated with or without AG at the concentration of 20 μM for 15 minutes before treatment with the bacterial extracts. Nitrite levels in the culture medium were analyzed by Griess reagent after 28 hours. Data shown are expressed as the mean±SEM of three independent experiments conducted in duplicate. The two-way analysis of variance followed by the Bonferroni's post-hoc test was used to assess the presence of statistically significant differences between the data groups: *P<0.05, P<0.01, **P<0.0001 with respect to the control (untreated). #P<0.05, ##P<0.01, ###P<0.001, ####P<0.0001 with respect to each corresponding culture without AG.

Figure 4A:
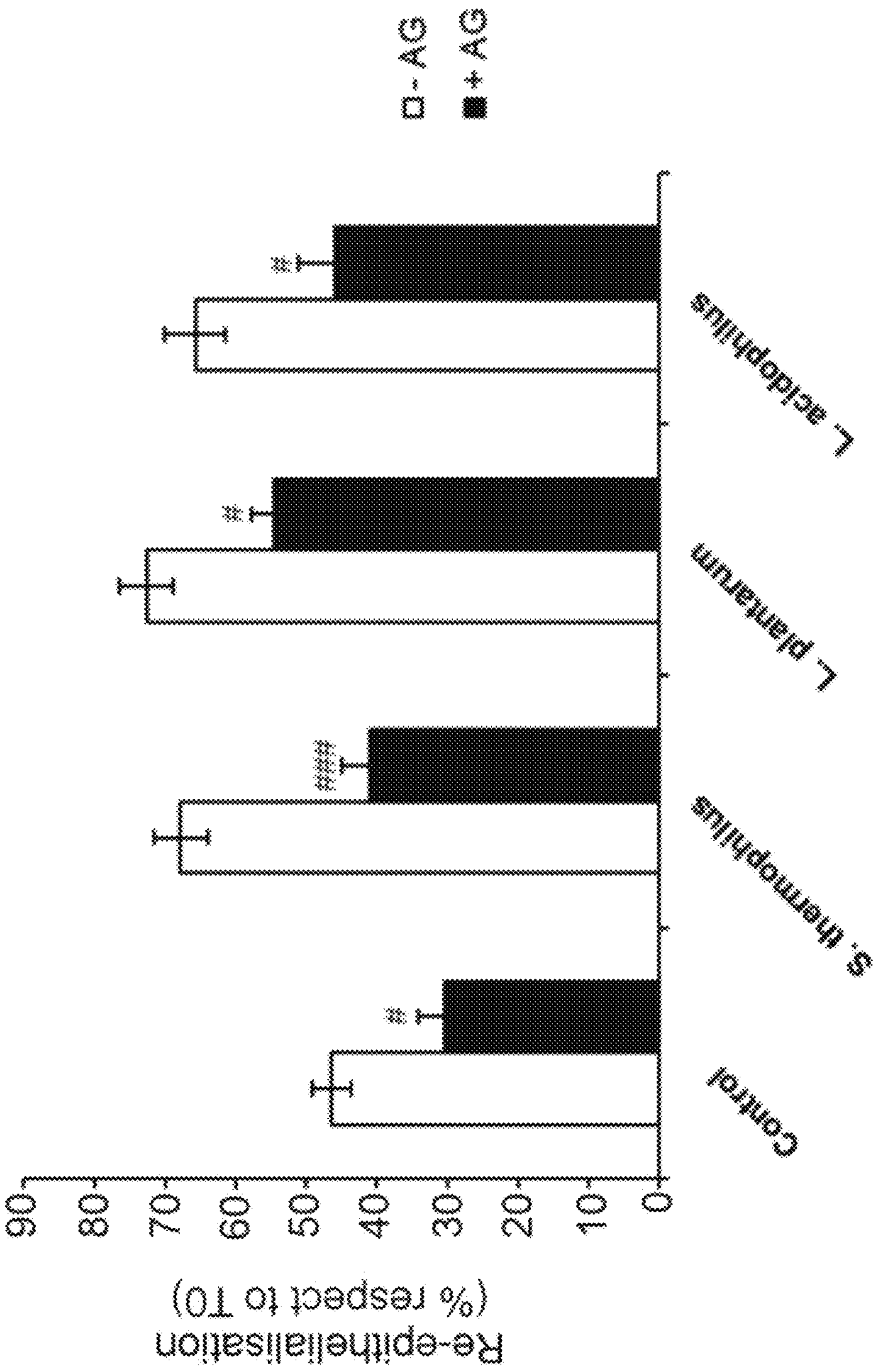
Figure 4B:
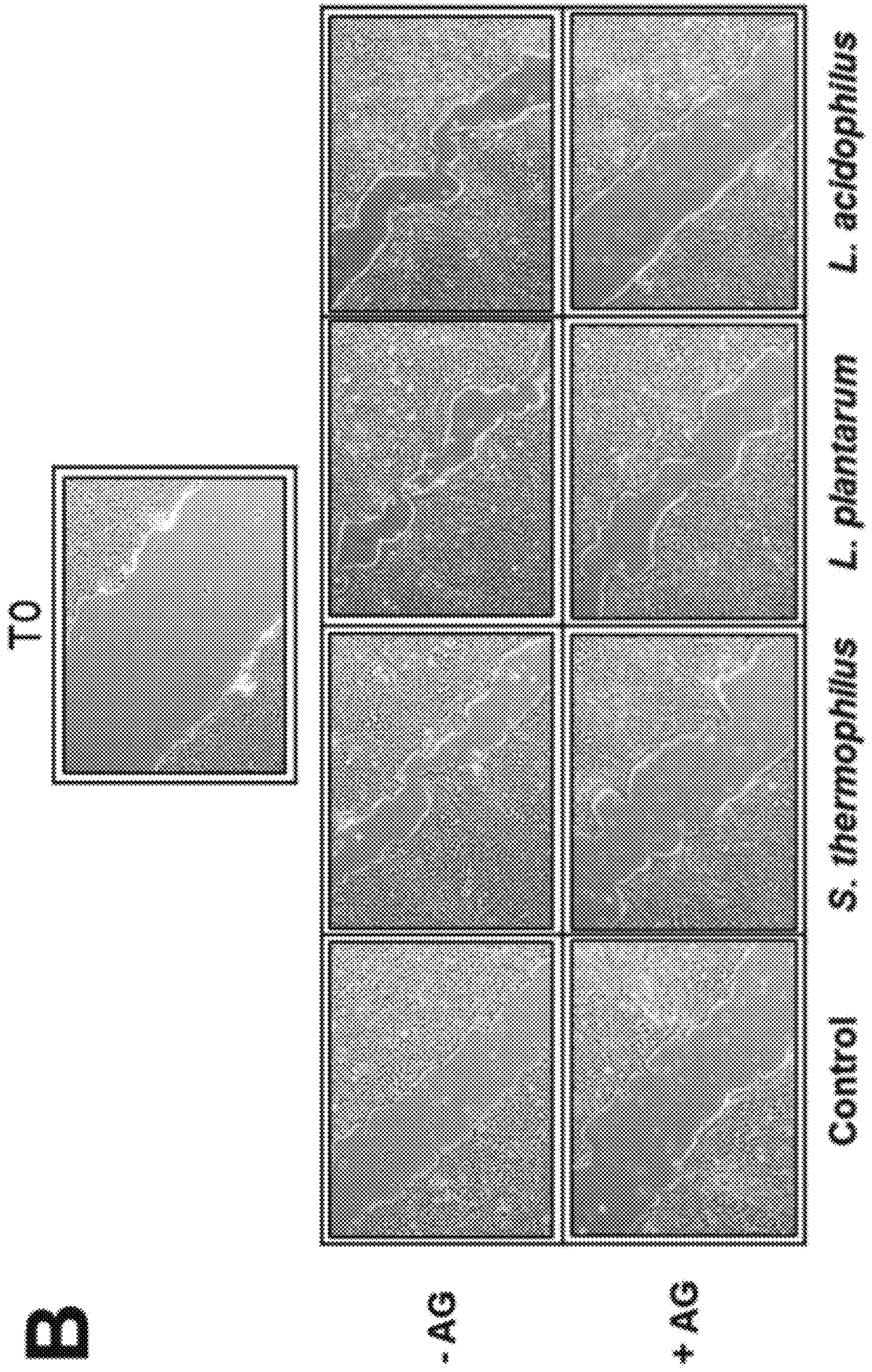

FIG. 4A-B illustrate the effect of iNOS inhibitor AG on the re-epithelialization of scratched monolayers of HaCaT cells induced by *S. thermophilus, L. plantarum* and *L. acidophilus:*

FIG. 4(A) graphically illustrates the effect of a 15-minute pre-treatment with AG, at the concentration of 20 μM, on the closing relative rate of scratched mono-layers treated with probiotic extracts, at the concentration of 50 μg/ml, for 20 hours. The data are expressed as the mean±SEM of three independent experiments conducted in duplicate. The two-way analysis of variance (ANOVA) followed by the Bonferroni's post-hoc test was used to assess statistically significant differences. #P<0.05, ##P<0.01 with respect to each corresponding culture without AG, and FIG. 4(B) illustrates images representing scratched monolayers of HaCaT cells with and without pre-treatment with AG, at the concentration of 20 μM, and subsequent exposition to extracts of *S. thermophilus, L. plantarum* or *L. acidophilus*, at the concentration of 50 μg/ml, for 20 hours (magnification 10×).

Figure 5A:
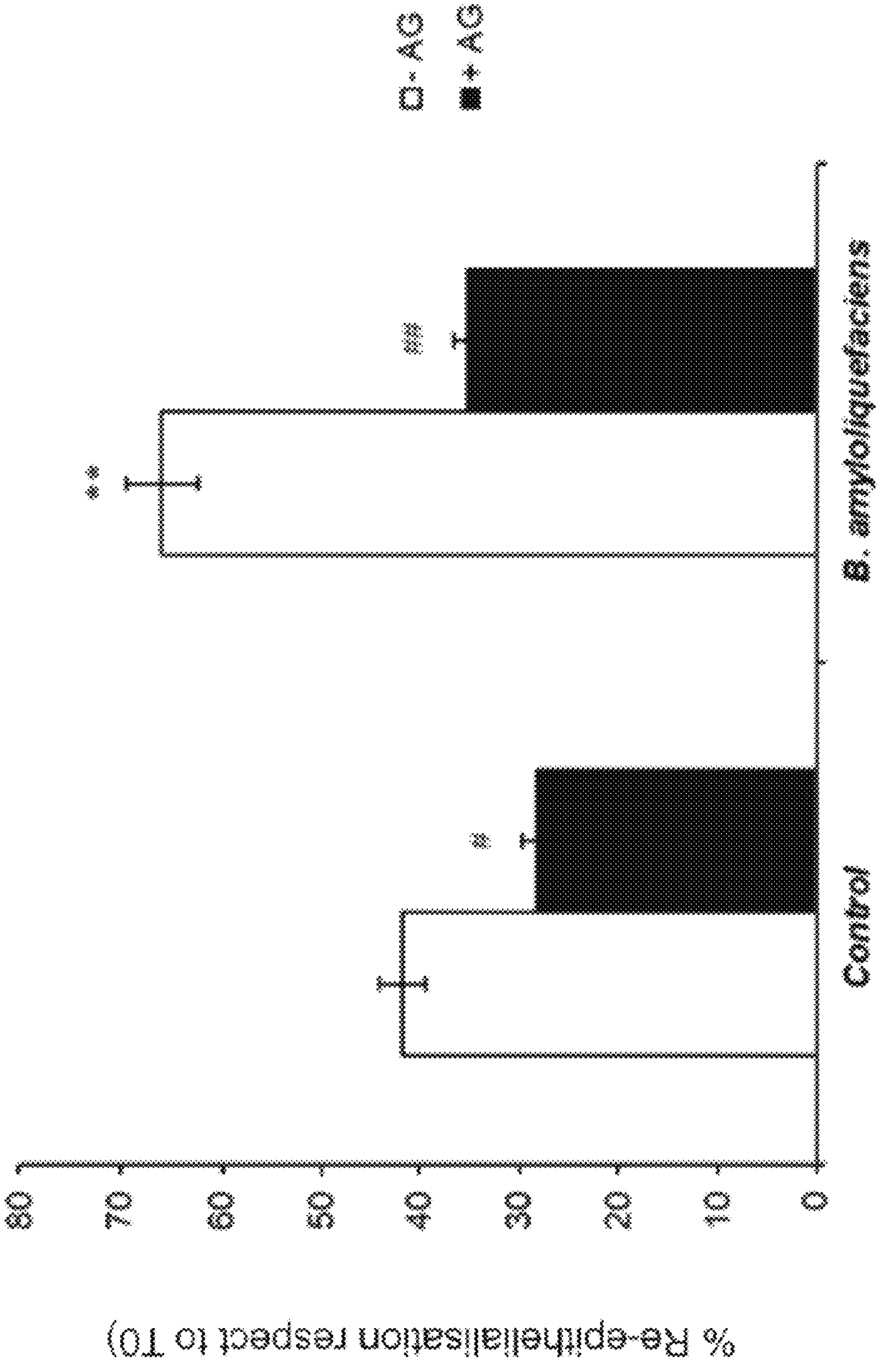
Figure 5B:
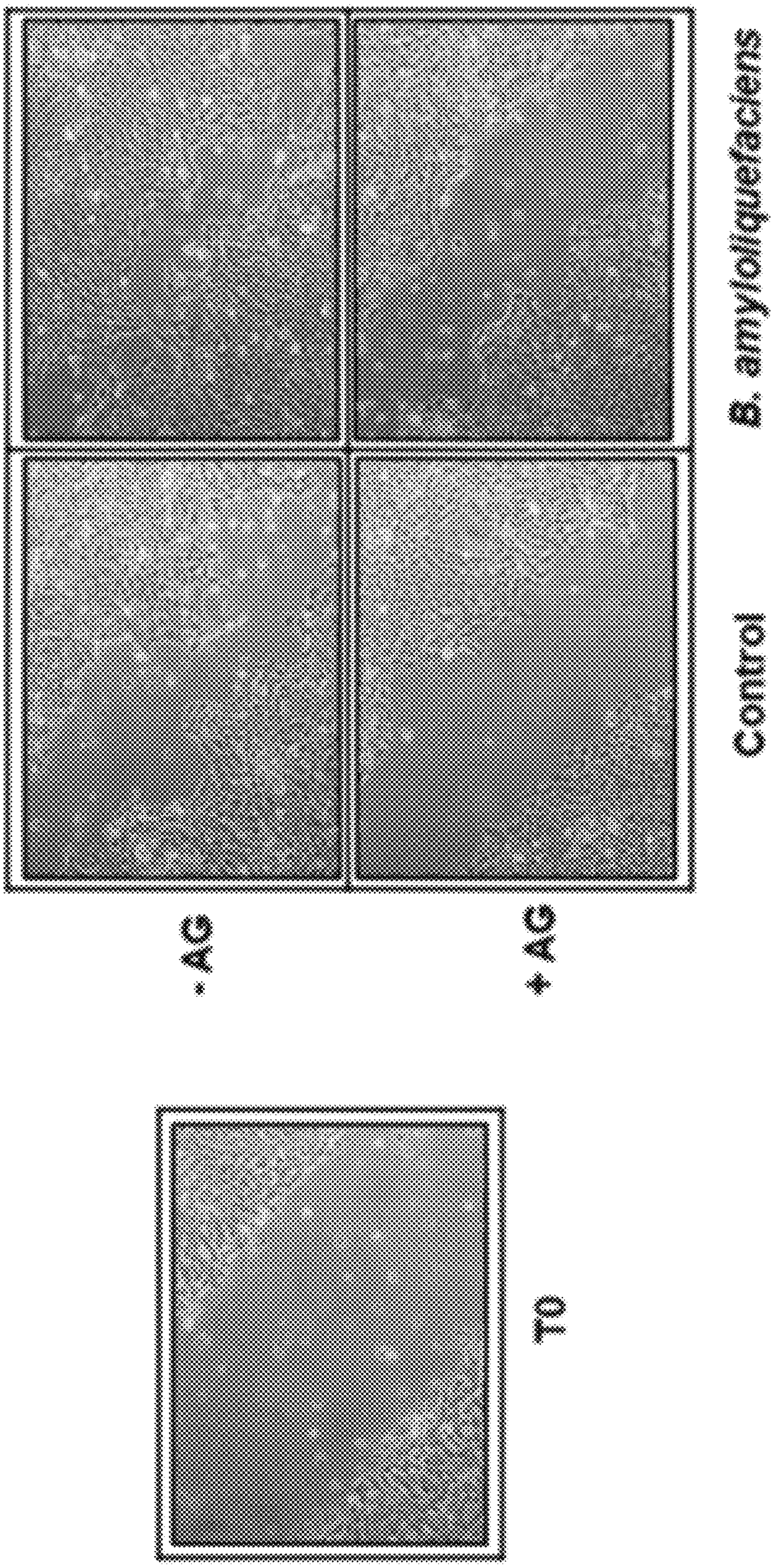

FIG. 5A-B illustrate the effect of iNOS inhibitor AG on the re-epithelialization of scratched monolayers of HaCaT cells induced by the addition of *Bacillus amyloliquefaciens* extract, at the concentration of 20 μg/ml, for 20 hours:

FIG. 5(A) illustrates the effect of 15-minute pre-treatment with AG, at the concentration of 20 μM, on the closing relative rate of scratched monolayers treated with *B. amyloliquefaciens* extract, at the concentration of 20 μg/ml, for 20 hours. The data are expressed as the mean±SD of an experiment conducted in duplicate, representative of 3 independent experiments conducted in duplicate. The two-way analysis of variance (ANOVA) followed by the Bonferroni's post-hoc test was used to assess statistically significant differences between the data groups. (#P<0.05, ##P<0.01) with respect to each corresponding culture without AG. P<0.01 with respect to control; and FIG. 5**(B) illustrates images representing scratched monolayers of HaCaT cells pre-treated with AG 20 M for 15 min or not pre-treated and then added with *B. amyloliquefaciens* extracts at 20 μg/ml for 20 hours (magnification 10×).

Figure 6:
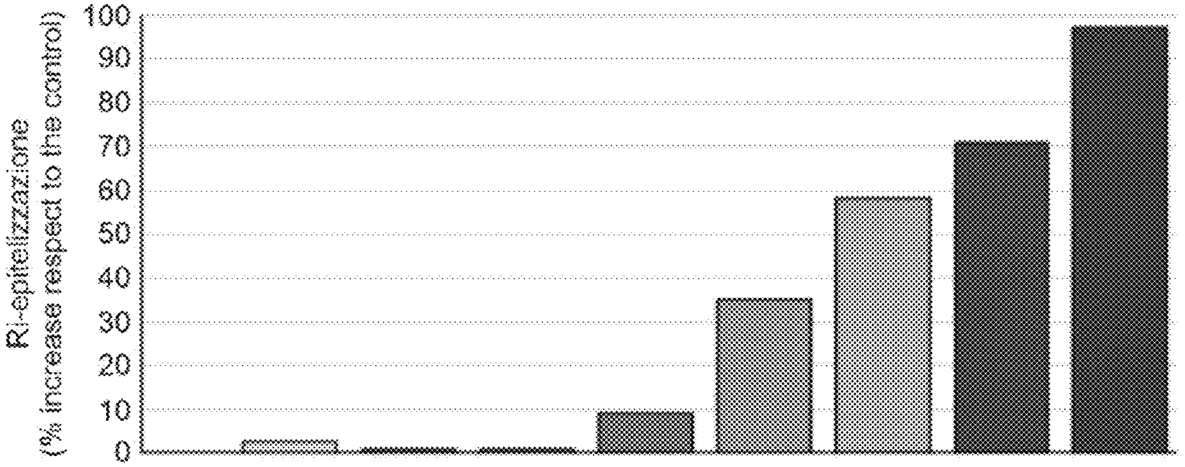

FIG. 6 graphically illustrates the effect of different combinations of bacterial extracts, at the indicated concentrations, on the re-epithelialization of scratched monolayers of HaCaT cells 20 hours after scratching. The data are expressed as the average increase (%) of re-epithelialisation with respect to untreated control.

Figure 7A:
Figure 7B:

FIG. 7A-B:

FIG. 7A illustrates a Photograph of the right foot of a patient with diabetes ulcers and post-operative wound following amputation of a toe (Day 36), and FIG. 7B illustrates a Magnified photograph of the foot of FIG. 6A.

Figure 8A:
Figure 8B:

FIG. 8A-B:

FIG. 8A illustrates a Photograph of the foot of FIG. 6A on Day 48 in side view, and FIG. 8B illustrates a Magnified photograph of the foot of FIG. 7A in front view.

Figure 9A:
Figure 9B:

FIG. 9A-B:

FIG. 9A illustrates a Photograph of the foot of FIG. 6A on Day 57 in front view, and FIG. 9B illustrates a Magnified photograph of the foot of FIG. 8A in side view.

Figure 10A:
Figure 10B:

FIG. 10A-B:

FIG. 10A illustrates a Photograph of the foot of FIG. 6A on Day 170 in front view, and FIG. 10B illustrates a Magnified photograph of the foot of FIG. 9A in side view.

DETAILED DESCRIPTION

*Lactobacillus plantarum* NCIMB 43029 strain cited above according to the present invention is the strain of *Lactobacillus plantarum* deposited on Apr. 20, 2018 at the NCIMB Ltd. collection centre, Ferguson Building, Craibstone Estate, Bucksburn, Aberdeen AB21 9YA, Scotland, UK, and having the NCIMB access number 43029.

Said *Lactobacillus plantarum* NCIMB 43029 has been deposited at NCIMB Ltd. by Professor Claudio De Simone, 51 Route des Chenolettes 1660, Château-d'OEx, Switzerland.

Professor Claudio De Simone has authorized the owner of the present patent application to refer to *Lactobacillus plantarum* NCIMB 43029 in the present document and has given his consent to make available *Lactobacillus plantarum* NCIMB 43029 to the public under R. 33 EPC.

The main features shown by *Lactobacillus plantarum* NCIMB 43029 as previously defined are the high ability to activate and induce the expression of iNOS, to significantly increase nitric oxide levels, as evidenced by the nitrite dosage, and therefore to markedly act on the re-epithelialization of lesions or wounds.

In vitro and in vivo evidences have also shown that *Lacto-bacillus plantarum* NCIMB 43029 exerts a high antibacterial action.

*Lactobacillus acidophilus* NCIMB 43030 according to the present invention is the strain of *Lactobacillus acidophilus* deposited on Apr. 20, 2018 at the NCIMB Ltd. collection centre, Ferguson Building, Craibstone Estate, Bucksburn, Aberdeen AB21 9YA, Scotland, UK, and having the access number NCIMB 43030.

Said *Lactobacillus acidophilus* NCIMB 43030 has been deposited at NCIMB Ltd by Professor Claudio De Simone, 51 Route des Chenolettes 1660, Château-d'OEx, Switzerland.

Professor Claudio De Simone has authorized the owner of the present patent application to refer to *Lactobacillus acidophilus* NCIMB 43030 in the present document and has given his consent to make available *Lactobacillus acidophilus* NCIMB 43030 to the public under R. 33 EPC.

The main features shown by *Lactobacillus acidophilus* NCIMB 43030 as previously defined are the high ability to activate and induce the expression of iNOS, to significantly increase nitric oxide levels, as evidenced by the nitrite dosage, and therefore to markedly act on the re-epithelialization of lesions or wounds.

In vitro and in vivo evidences have also shown that *Lactobacillus acidophilus* NCIMB 43030 exerts a high antibacterial action.

Said strains of probiotics are new and are the subject of the present invention, as already mentioned above.

It has also surprisingly been found that *Lactobacillus plantarum* and *Lactobacillus acidophilus* in combination show enhanced antibacterial and re-epithelializing effects, which has never been observed in compositions including probiotics currently known in the art.

An object of the present invention is therefore a composition, including *Lactobacillus plantarum* and *Lactobacillus acidophilus*, having both antibacterial and re-epithelializing action.

According to a preferred aspect of the invention, the composition of the invention further includes *Streptococcus thermophilus* and/or *Bacillus amyloliquefaciens.*

According to a particularly preferred aspect of the invention, the composition with both antibacterial and re-epitelializing action of the invention includes *Lactobacillus plantarum, Lactobacillus acidophilus* and *Streptococcus thermophilus.*

According to another particularly preferred aspect of the invention, the composition with antibacterial, re-epitelializing and antifungal action includes *Lactobacillus plantarum, Lactobacillus acidophilus, Streptococcus thermophilus* and *Bacillus amyloliquefaciens.*

A composition according to the present invention is typically a composition for topical use, preferably in the form of powder, granules, gingival or vaginal tablet, or for oral use, preferably in the form of a capsule or gel.

The composition according to the present invention exerts an enhanced antibacterial effect because *Lactobacillus plantarum* and *Lactobacillus acidophilus* in combination are able to exert a synergistic effect in reducing molecules of bacterial origin.

The composition according to the present invention exerts a re-epithelializing effect because *Lactobacillus plantarum, Lactobacillus acidophilus* and *Streptococcus thermophilus* are able to activate and induce the expression of iNOS and thus the production of nitric oxide.

Preferably, the *Lactobacillus plantarum* in the composition according to the present invention is the NCIMB 43029 strain as previously identified.

Preferably, the *Lactobacillus acidophilus* in the composition according to the present invention is the NCIMB 43030 strain as previously identified.

Preferably, the *Streptococcus thermophilus* in the composition according to the present invention is the strain comprising the hypervariable regions V1-V2 of the gene encoding for the 16S rRNA of SEQ ID NO: 7, the gene recA of SEQ ID NO: 8 and the gene secA of SEQ ID NO: 9.

Preferably, the *Bacillus amyloliquefaciens* in the composition according to the present invention is the known strain characterized by SEQ ID NO: 10 encoding for the 16S rRNA.

The percentage by weight of *Lactobacillus plantarum* in the composition is in the range from 1% to 40% by weight on the basis of the total weight of the composition.

The percentage by weight of *Lactobacillus acidophilus* in the composition is in the range from 1% to 40% on the basis of the total weight of the composition.

The percentage by weight of *Streptococcus thermophilus* in the composition is in the range from 0.5% to 20% on the basis of the total weight of the composition.

The percentage by weight of *Bacillus amyloliquefaciens* in the composition is in the range from 0.1% to 10% on the basis of the total weight of the composition.

A preferred aspect of the invention is a composition with both antibacterial and re-epithelializing action, comprising:

from 10% to 90% by weight of *Lactobacillus plantarum*, and from 90% to 10% by weight of *Lactobacillus acidophilus* on the basis of the total weight of the composition.

A preferred aspect of the invention is also a composition with both antibacterial and re-epithelializing action, comprising:

from 20% to 80% by weight of *Lactobacillus plantarum,* from 40% to 10% by weight of *Lactobacillus acidophilus*, and from 40% to 10% by weight of *Streptococcus thermophilus* on the basis of the total weight of the composition.

A preferred aspect of the invention is also a composition with antibacterial, re-epithelializing and antifungal action, comprising:

from 10% to 80% by weight of *Lactobacillus plantarum,* from 40% to 10% by weight of *Lactobacillus acidophilus,* from 40% to 9% by weight of *Streptococcus thermophilus*, and from 10% to 1% by weight of *Bacillus amyloliquefaciens* on the basis of the total weight of the composition.

In a preferred aspect of the invention, the bacteria *Lactobacillus plantarum, Lactobacillus acidophilus, Streptococcus thermophilus*, and/or *Bacillus amyloliquefaciens* in the composition are live bacteria.

Alternatively, the bacteria *Lactobacillus plantarum, Lacto-bacillus acidophilus, Streptococcus thermophilus*, and/or *Bacillus amyloliquefaciens* are non-viable bacteria, typically made non-viable by irradiation or by alternative techniques.

Preferably, the composition according to the present invention comprises at least one pharmaceutically acceptable excipient chosen from the group comprising algae, bee pollen, honey, ventilated clay, and zeolite.

Another object of the present invention is a composition according to the present invention for use as a medicament, in particular for the re-epithelialization of a lesion or wound. Preferably, said re-epithelialisation process is carried out by the activation or the induction of iNOS.

According to the present invention, the term "wound" means an open wound, a chronic wound, an acute wound, a burn wound, a post-operative wound, a trauma wound, a dermabrasion, an ulcer such a diabetes ulcer, a pressure sore or an ulceration of the gastro-intestinal tract.

A preferred aspect is a composition according to the present invention for use in a procedure of re-epithelialization of a lesion or wound chosen in the group which includes an open wound, a chronic wound, an acute wound, a burn wound, a post-operative wound, a trauma wound, a dermabrasion, an ulcer such a diabetes ulcer, a pressure sore.

Said lesion or wound can typically affect either the skin or the mucous membranes, particularly the oral, vaginal or rectal mucosa, but can also be a gastrointestinal lesion.

A preferred aspect of the present invention is therefore said composition for use in a process of re-epithelialization of a lesion or wound of the skin, of the oral, vaginal or rectal mucosa, or of the gastrointestinal mucosa.

Preferably, when said composition is for use in a process of re-epithelialization of a lesion or wound of the skin, the oral, vaginal or rectal mucosa, ulcers such as diabetes ulcers or pressure sores, said composition is for topical use in the form of granules or powder, gingival tablet or vaginal tablet.

Preferably, when said composition is for use in a process of re-epithelialisation of a lesion or wound of the gastrointestinal mucosa, said composition is for oral use in the form of a capsule or gel.

Said lesion or wound, according to the present invention, may be affected by biofilms consisting of Gram-negative bacteria such as *Enterococcus faecalis, Klebsiella pneumoniae, Proteus mirabilis, Candida Albicans.*

A further object of the present invention is a bandage comprising a composition according to the present invention as previously defined.

A preferred object of the present invention is a bandage comprising a composition according to the present invention for use as a medicament, in particular in a procedure of re-epithelialization of a lesion or wound.

A further object of the present invention is a kit comprising a sterile compressible container or single-dose or multidose pump containing a composition according to the present invention and the corresponding package leaflet.

Experimental Part

Effects of Bacterial Strain Extracts on Healing of a Wound Produced on a Scratched Monolayer of HaCaT Cells (Human Keratinocyte Cell Line)

Figure 1A:
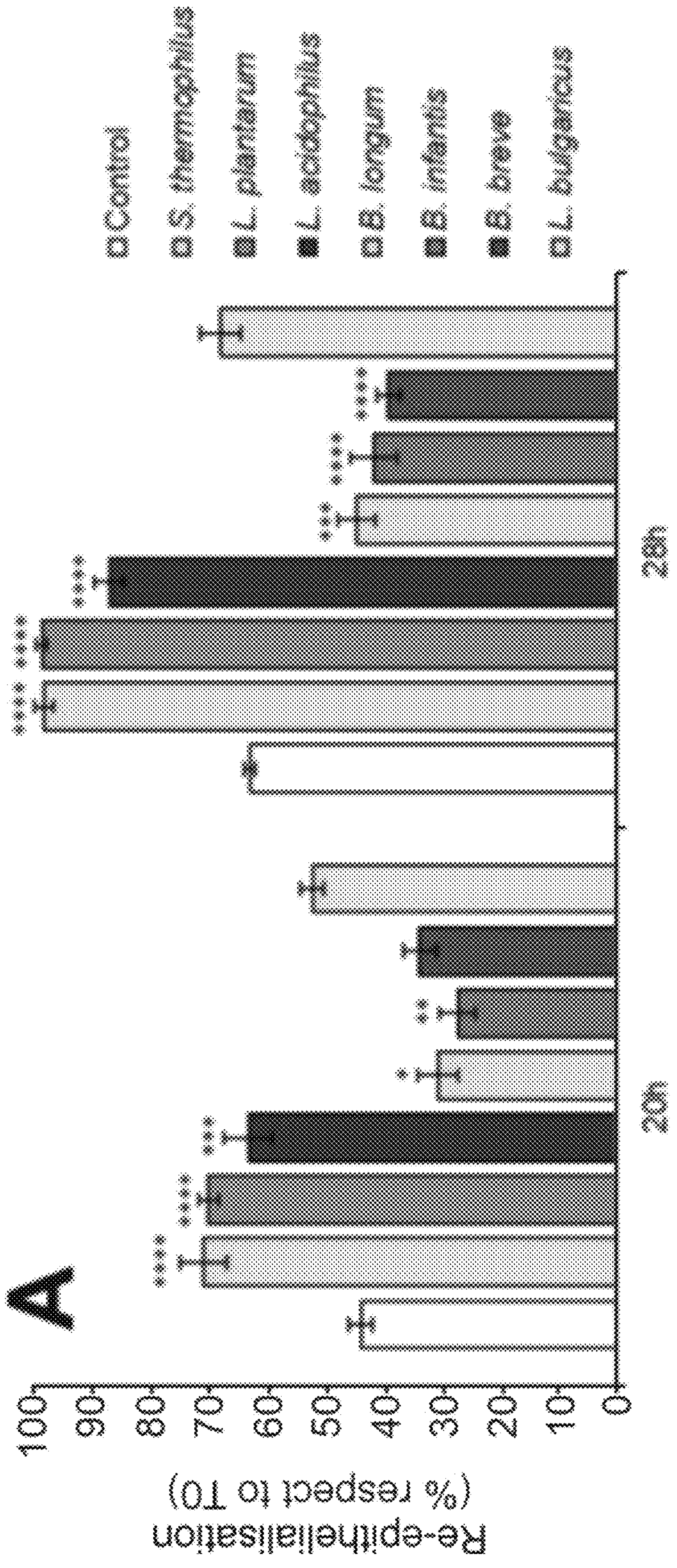
FIG. 1A-B graphically illustrate the effect of bacterial extracts on the re-epithelialization of scratched monolayers of the human keratinocyte cell line HaCaT at different time points.
Figure 1B:
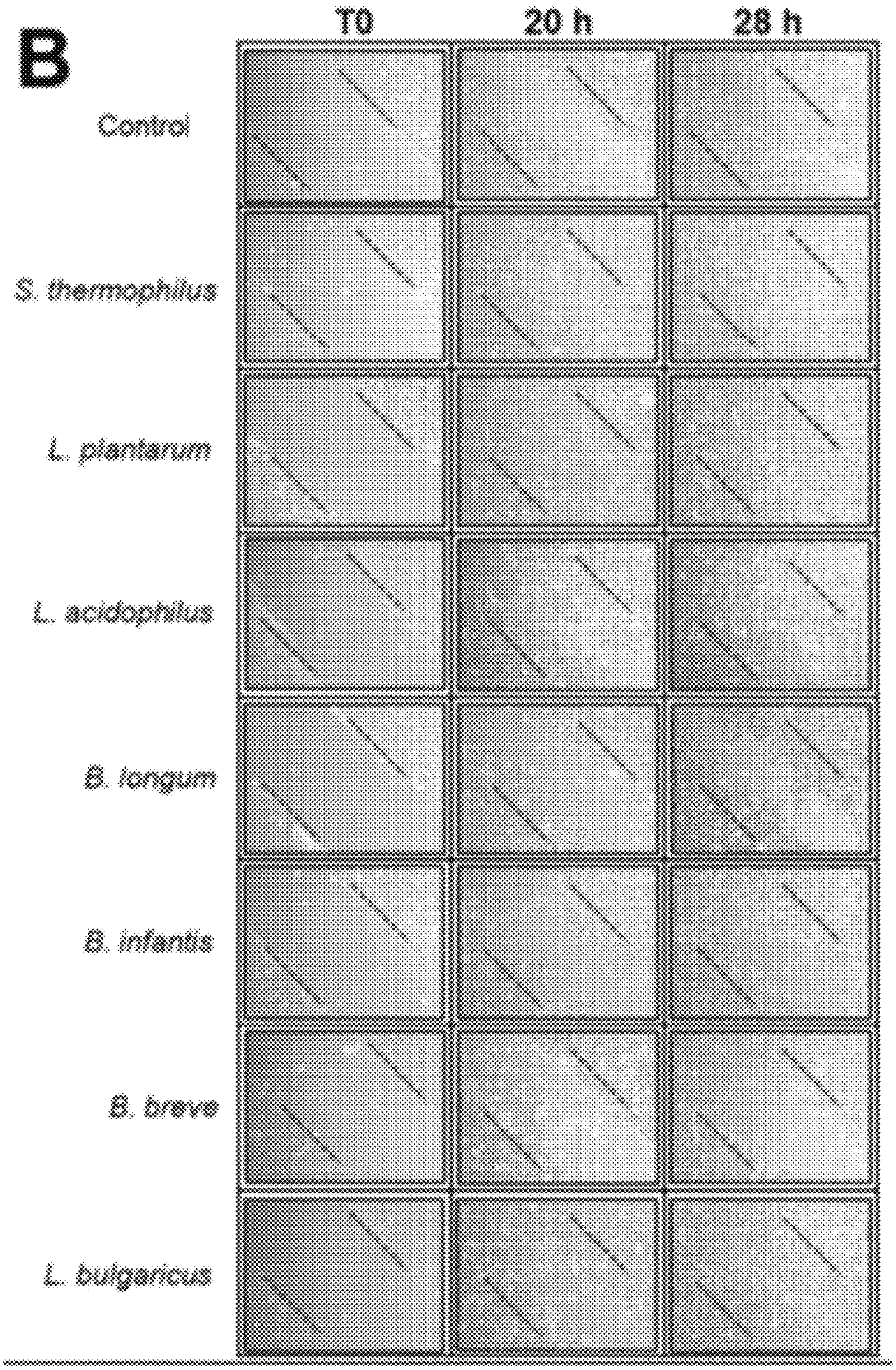

The inventor has evaluated the ability of extracts obtained from selected bacterial strains to influence wound re-epithelialization using an in vitro artificial wound model. The rate of closure of the scratched monolayer in untreated cells and in cells treated with each bacterial extract at the concentration of 50 μg/ml is shown and evaluated through the observation of the repopulation of the area between the wound edges at different time points after the wound generation. In order to quantitatively analyze the effects of the bacterial extracts on the closure of the wound area, images obtained by using an inverted phase contrast microscope at 0, 20, 28 and 45 hours after the scratch were acquired and expressed as a percentage of closure by using an automatical calculation system to evaluate the percentage of area occupied by said cells with respect to the total surface area analyzed. In all experiments, the scratched monolayers of the control cells (un-treated) were completely healed after 36-42 hours. The percentages of re-epithelialization at 20 and 28 hours in the presence or in the absence of bacterial extracts were compared to the wound of the corresponding monolayer at TO. The results expressed as percentages of relative re-epithelialization (mean±SEM from three independent experiments conducted in duplicate) as well as the images representing microscopic observations of scratched monolayers are shown in FIGS. 1A and 1B respectively. Treatment with the extracts from *S. thermophilus* or *L. plantarum* significantly accelerated the repairing rate with respect to the untreated control both at 20 hours and 28 hours after the generation of the wound. In contrast, treatment with the extracts of *B. longum, B. infantis* and *B. breve* significantly delayed the repair process of the monolayer with respect to the untreated control. Extract from *L. bulgaricus* did not seem to significantly influence the wound closure rate with respect to control at both observation time points.

Expression of iNOS and Nitrite Levels

Figure 2B:
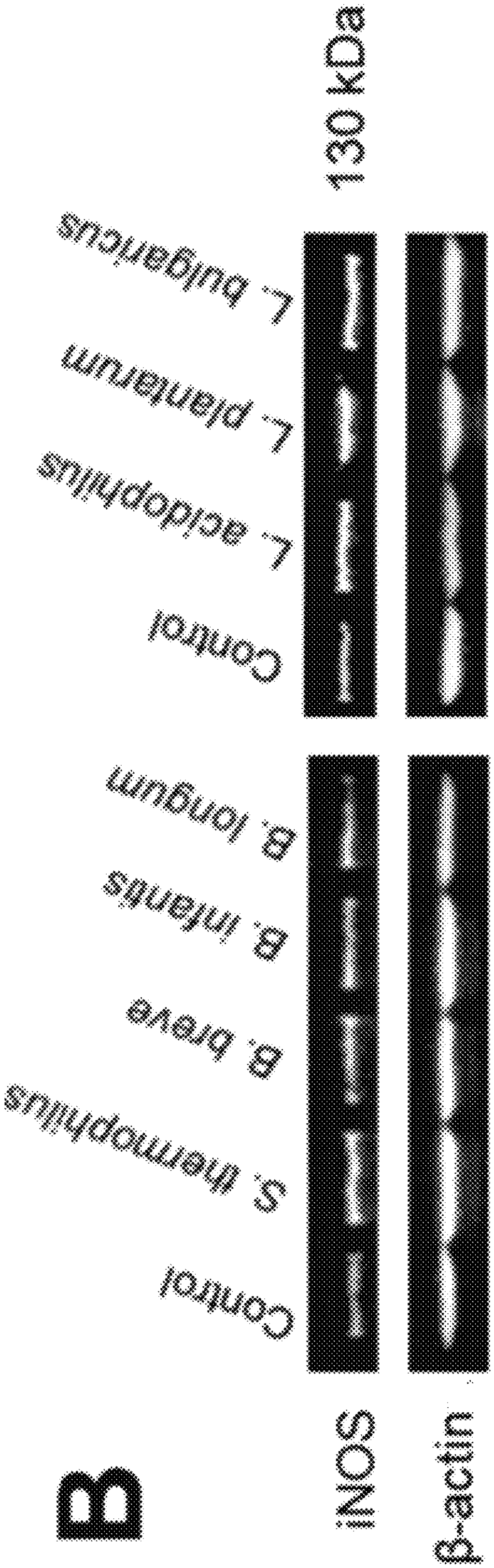

In order to investigate the potential involvement of iNOS in the above mentioned effects of bacterial extracts on the HaCaT cells monolayer repair procedure, the inventors have initially analyzed by Western blot the iNOS protein levels in the monolayers 28 hours after the scratch generation in the absence or in the presence of the bacterial extracts at the concentration of 50 μg/ml. The values obtained by densitometric analysis of the iNOS bands were normalised with respect to those concerning β-actin. The data expressed as the mean±SEM of three independent experiments conducted in duplicate with an image representing iNOS immunoblots are shown in FIGS. 2A and 2B respectively. The results indicate that the treatment with extracts of *S. thermophilus, L. plantarum* and *L. acidophilus*, in line with their ability to accelerate the re-epithelialization of the monostrate, led to a marked over-regulation of iNOS protein expression with respect to that observed in the control cells. The most relevant effect could be observed with *L. acidophilus* and *L. plantarum. S. thermophilus* extract was also capable of significantly increasing the expression level of the iNOS protein, although to a lower extent. The extract of *L. bulgaricus*, which had no significant effect on the healing of the wound generated on the monolayer, was also unable to modulate iNOS expression with respect to what observed for the cell monolayer used as a control. On the other hand, the monolayers of HaCaT cells exposed to extracts of *B. longum, B. infantis* and *B. breve*, all strains being capable of inhibiting wound closure rate, showed significantly lower levels of iNOS protein with respect to the untreated condition.

The ability of bacterial extracts to regulate iNOS was further analyzed by measuring the nitrite levels in supernatants of scratched monolayers of HaCaT cells pre-treated with AG, a selective iNOS inhibitor, or not treated with such inhibitor (known from T. P. Misko et al., *Eur. J. Pharmacol*, 1993, 233:119-125).

As shown in FIG. 3, the AG pre-treatment significantly prevented the increase in nitrite production due to its ability to inhibit iNOS activity induced by scratching the control monolayer. The treatment with extracts of *S. thermophilus, L. acidophilus* and *L. plantarum*, capable of modulating iNOS expression, induced a significant increase in nitrite levels in the culture medium with respect to the control monolayer, even if to different degrees. Notably, the stimulatory effect of the extracts of *S. thermophilus, L. acidophilus* and *L. plantarum* on the generation of nitrites was totally or partially prevented by the pre-treatment with AG, further supporting the evidence of the ability of these probiotics to induce iNOS expression and activity.

Conversely, the extracts of *B. longum, B. infantis* and *B. breve*, induced a significant decrease in nitrite levels, with respect to control, confirming their inhibitory effect on the iNOS expression degree. In accordance with the results of the experiments on iNOS expression, pre-treatment with AG did not significantly influence nitrite levels in cell cultures treated with *B. longum, B. infantis* and *B. breve* with respect to monolayers treated with bacterial extracts alone. Treatment with the extract of *L. bulgaricus* did not significantly affect nitrite levels with respect to untreated cultures, while the AG pretreatment significantly decreased nitrite levels with respect to the corresponding sample not treated with the inhibitor.

The effect of AG, a iNOS inhibitor, on wound closure rate has also been evaluated on the ability of extracts of *L. plantarum, S. thermophilus* and *L. acidophilus* to accelerate the wound closure process in vitro. The results, expressed as the mean±SEM of three experiments in duplicate, relate to % re-epithelialization at 20 hours, with respect to the scratch area produced at T0 in the cell monolayer in the presence or in the absence of bacterial extracts at the concentration of 50 μg/ml (FIG. 4A). Images representing microscopic observations are also shown (FIG. 4B). As expected, in accordance with the role of iNOS activity in wound healing, the pre-treatment with AG had a strong effect on the physiological repairing of the control monolayer and significantly prevented the stimulating effect of all these bacterial extracts in terms of monolayer repairing rate expressed as % of re-epithelialization with respect to the area of the scratch generated at the beginning of the experiment.

Taken together, these results strongly suggest that the increase of the expression and activity of iNOS plays a crucial role in the re-epithelialization process promoted by the chosen probiotic extract.

The ability to accelerate the re-epithelialization process has also been demonstrated following treatment with *Bacillus amyloliquefaciens* extract at a concentration of 20 μg/ml (FIG. 5). Also in this case, the involvement of iNOS was demonstrated by the ability of its specific inhibitor, aminoguanidine (20 μM), to block the stimulatory effect induced by treatment with *B. amyloliquefaciens*. FIG. 5A shows the results, expressed as means±SD, concerning the % of re-epitelialisation with respect to the area of the scratch generated at T0, after 20 hours of treatment with extracts of *B. amyloliquefaciens*. The results are representative of 3 independent experiments conducted in duplicate. #P<0.05 and ##P<0.01 with respect to the corresponding sample without AG; **P<0.01 with respect to the untreated control.

In order to evaluate the effect of treatments conducted with different combinations of probiotics on the re-epithelialization process of scratched HaCaT cell monoayers, concentrations of the individual strains (*L. plantarum, L. acidophilus, S. thermophilus* and *B. amylo-liquefaciens*) showing alone no significant influence on the repair of the lesion were used. In fact, treatment of the scratched monolayers with the individual bacterial extracts at a concentration of 10 μg/ml did not significantly influence, after 20 hours from the lesion, the % of wound closure with respect to the untreated control (re-epithelialization <10%). On the other hand, the combined treatment with *L. plantarum* and *L. acidophilus*, both at a concentration of 10 μg/ml, resulted in an increase in the repairing rate of the wounded monolayer of about 35% 20 hours after the injury. The combination of *L. plantarum* (10 μg/ml), *L. acidophilus* (10 μg/ml) and *S. thermophilus* (10 μg/ml) led to a significant increase (about 60%) in the repairing rate of the wounded monolayer observable after 20 hours of treatment. Similarly, the combined treatment with *L. plantarum* (10 μg/ml), *L. acidophilus* (10 μg/ml) and *B. amyloliquefaciens* (10 μg/ml) led to an increase in the repairing rate of over 70% after 20 hours of treatment. The combination of *L. plantarum* (10 μg/ml), *L. acidophilus* (10 μg/ml), *S. thermophilus* (10 μg/ml) and *B. amyloliquefaciens* (10 μg/ml) was even more effective in accelerating the re-epithelialization of the damaged monolayer, resulting in an increase in the wound closure rate of 97-98% after 20 hours.

Conclusions

Given the important barrier function played by epidermis when a wound occurs, it is necessary to restore tissue integrity as quickly and efficiently as possible by favoring the re-epithelialization process.

The proliferation and migration of keratinocytes is an essential step in the re-epithelialization process during wound healing.

In the present study, the inventor compared the effect exerted by seven different probiotic strains on an in vitro wound healing model, under the same experimental conditions. Obtained results evidence that the extracts of *L. plantarum, L. acidophilus, S. thermophilus* and *B. amyloliquefaciens* promote the re-epithelialization of scratched monolayers of HaCaT cells. In contrast, extracts of *B. infantis, B. breve* and *B. longum* inhibit the re-epithelialization process, while the bacterial extract of *L. bulgaricus* has no effect on wound repair in vitro.

The mechanism underlying the increase in re-epithelialization induced by *L. plantarum, L. acidophilus, S. thermophilus* and *B. amyloliquefaciens* involves the increased expression and activity of iNOS, as demonstrated by immunoblot data, the nitrite level assay and the effect of pretreatment with aminoguanidine, a iNOS-specific inhibitor. On the other hand, *B. infantis, B. breve* and *B. longum*, significantly decrease the expression and activity of iNOS in scratched HaCaT cell monolayers. In this context, also the bacterial extract of *L. bulgaricus* showed no effect.

Taken together, these results strongly suggest that the pro- or anti-healing properties strictly depend on the ability of probiotics to up- or down-regulate the expression and activity of iNOS, as also supported by the experiments conducted in the presence of AG. The data obtained from the inventor extend the range of mechanisms underlying the effects of probiotics on the re-epithelialisation process and may justify their use in the treatment of chronic wounds. Evidences provided should be the subject of further detailed studies to investigate the potential therapeutic use of probiotics, particularly in terms of dose standardisation and detailed characterisation of beneficial effects. In addition, changes in production processes, which could result in harmful differences in the probiotic product, should be closely monitored in terms of safety and/or efficacy.

It follows from the above that also the choice of the probiotic strain is very important, since the effects of these bacteria may be highly strain-specific.

Materials and Methods

Preparation of Bacterial Samples for the Cellular Treatments

*L. plantarum, L. acidophilus* and *S. thermophilus* were obtained from DuPont Danisco, Wilmington, Delaware, USA. *L. bulgaricus* and *B. longum* were obtained from Bioprox, Noyant, France. *B. breve* and *B. infantis* were obtained from Centro Sperimentale del Latte S.r.l., Zelo Buon Persico LO, Italy. *B. amyloliquefaciens* was obtained from Sanzyme Biologics Private Limited, Hyderabad, Telangana, India.

For the preparation of the bacterial extracts, stocks of 1 g of each freeze-dried bacterium resuspended with phosphate buffered saline (PBS, Euro Clone, West York, UK) were centrifuged at 8,600×g, washed twice, resuspended in 10 ml of PBS and sonicated (30 min, alternating 10 s of sonication and 10 s of pause) using a Vibracell sonicator (Sonic and Materials, Danbury, CT).

Bacterial cell rupture was verified by measuring the absorbance of the sample at 590 nm (Eppendorf Hamburg, Germany) before and after each sonication step. The samples were then centrifuged at 17,949×g, and the supernatants were filtered using a 0.22 μm pore filter (Corning Incorporated, Corning, NY, USA) to remove any remaining whole bacteria. Total protein content was determined by the BioRad DC protein assay (BioRad, Hercules, CA) using bovine serum albumin (BSA, Sigma Aldrich, Saint Louis, MO, USA) as standard. For in vitro experiments, the bacterial preparation was added to cell cultures along different time intervals, as specified below, using different amounts to obtain different concentrations expressed as μg protein/ml as final concentrations.

Cell Lines and Culture Conditions

The HaCaT cell line of spontaneously immortalized human keratinocytes was purchased from Cell Lines Service GmbH (Eppelheim, Germany). HaCaT cells were cultured in DMEM supplemented with 10% (v/v) fetal calf serum (FCS), 2 mM L-glutamine, 100 U/ml penicillin and 100 μg/ml streptomycin (Euro Clone, West York, UK). The culture conditions were kept constantly at 37° C. in a humidified atmosphere with 5% $CO_2$. After reaching 80% confluency, cells were seeded, as specified below, in 6- or 12-well plates for sterile cell cultures (Becton Dickinson, San José, CA) at the concentration of 18,000 cells/cm$^2$. Non-adherent cells were removed by gentle washing in phosphate buffer (PBS, pH=7.4). Cells grown in a 12-well plate were collected at 20, 28 and 45 hours and live cells were counted with the trypan blue dye exclusion test (Euro Clone, West York, UK). The cells were incubated with bacterial extracts at various concentrations for different time intervals (20-48 hours), after which they were washed with PBS, centrifuged for 10 minutes at 400×g, and the pellets were incubated with a 0.04% trypan blue solution for 5 minutes to analyse the number of total cells and their viability. Untreated cells were also analysed and used as negative controls. The cells were transferred to a Bürker counting chamber and counted under a microscope Eclipse 50i (Nikon Corporation, Japan). For the selection of suitable concentrations of bacterial extract expressed as μg protein/ml, the viability of the HaCaT keratinocytes was analyzed using the trypan blue exclusion test. After 20-48 hours of incubation at various concentrations of bacterial extracts, no significant effects on cell viability or proliferation level with respect to untreated control cells were detected (data not shown). On the other hand, treatment with Triton X detergent (0.1%) resulted in a significant reduction (P≤0.01) in cell viability (positive control). For most experiments a concentration of bacterial lysate in the range of 10-50 μg/ml was used.

In Vitro Wound Healing Model

As previously described for the in vitro wound healing assay, HaCaT cells were grown in 6-well microplates using the culture conditions described above and subsequently allowed to proliferate until a confluence of approximately 90% was achieved; DMEM was then removed from the wells, and monolayers of cells were scratched using the tip of a 200 μl pipette to create a uniform cell-free area (wound) of reproducible size. The debris was removed from the culture by gentle washing with sterile PBS. The cells were then incubated with a fresh medium at 37° C. in a humidified atmosphere with 5% $CO_2$ in the presence or in the absence of bacterial extracts at the indicated final concentration (range 10-50 μg protein/ml). Where indicated, the cells were pre-treated for 15 minutes with 20 μM aminoguanidine (AG), a selective inhibitor of iNOS (Sigma Aldrich, St. Louis, MO, USA). Cell migration was monitored using a phase contrast inverted microscope Eclipse TS 100 (Nikon) and photographed at the start of the experiment (TO) as well as at different time points up to 45 hours after the injury. The experiments were conducted in duplicate with at least three-six fields evaluated for each condition. To calculate the wound closure %, the acquired images were quantitatively analyzed using the TScratch software. Quantification of the relative re-epithelialization was performed using the equation:

$$\%\text{ relative re-epithelialisation} = \frac{\%\text{ scratched area at } T=0 - \%\text{ scratched area at } T=n}{\%\text{ scratched area at } T=0}\times 100$$

where T is a specific time point after the scratch.

Western Blot Analysis of iNOS Expression

For the Western blot analysis, the scratched monolayers of untreated cells and cells treated with bacterial extract for 28 hours were collected, washed in PBS and lysed in RIPA buffer (RIPA Lysis Buffer, Merck KGaA, Darmstadt, Germany) containing a protease inhibitor mixture (carboxypeptidase inhibitor, 5 μg/ml trypsin inhibitor, PMSF 1 mM, 10 μg/ml leupeptin, 10 μg/ml aprotinin, 10 μg/ml pepstatin) (Sigma Aldrich, St. Louis, MO, USA). The samples were tested for protein content with the BioRad DC protein assay (BioRad, Hercules, CA) using BSA as standard. 25 μg of the proteins were mixed with sample buffer, boiled for 5 min at 100° C. and separated by polyacrylamide gel electrophoresis, 10% SDS. The proteins were transferred on 0.45 μm nitrocellulose membrane sheets (BioRad, Hercules, CA) for 1 hour at 4° C. at 70 V using Mini Trans-Blot Cell (BioRad, Hercules, CA) equipment. The membranes were blocked with 5% of fatty acid-free milk for 1 hour at room temperature and then incubated overnight at 4° C. with 1:500 polyclonal rabbit anti-iNOS antibody (Cell Signaling Technology, CA) or 1:1000 anti-β-actin antibody (Santa Cruz Biotechnology, Santa Cruz, CA). A secondary goat anti-rabbit IgG antibody conjugated to horseradish peroxidase (HRP) at the recommended dilution of 1:5000 for the anti-iNOS antibody and a secondary rabbit anti-goat IgG antibody conjugated to horseradish peroxidase (HRP) at the recommended dilution of 1:5000 for the anti-β-actin antibody (Millipore EMD, Darmstadt, Germany) were used. The immunoreactive bands were visualized by enhanced chemiluminescence (ECL, Amersham Pharmacia Biotech) according to the manufacturer's instructions. The relative band densities were determined using the ALLIANCE chemiluminescence detection system (UVITEC, Cambridge UK), and the values were expressed as relative units. The immunoblot data were normalised with respect to the corresponding protein levels of β-actin.

Nitrite Levels Assay

NO production was indirectly evaluated with the use of the Griess method by measuring nitrite levels using nitrate reductase and the Griess reaction based on a colorimetric assay. In short, supernatants (20 μl) of scratched monolayer of untreated cells and cells treated with bacterial extract for 28 hours were added to a 96-well microtiter plate together with Hepes 50 mM, FAD 5 μM, NADPH 0.1 mM, 0.2 U/ml nitrate reductase, 1,500 U/ml lactate dehydrogenase and 100 mM pyruvic acid, and finally the Griess reagent. Absorbance was measured by spectrophotometric reading at 550 nm using a microplate reader (Bio-Rad Hercules, California, USA). The values were interpolated with a standard curve with known concentrations of $KNO_3$.

Statistical Analysis

The data was analyzed using Prism 6.0 software, GraphPad, San Diego, CA. The results are expressed as the mean±SEM of three experiments conducted in duplicate. The results were considered statistically significant if $P<0.05$. For the comparison of the groups, the ANOVA test followed by the Bonferroni's or the Dunnett's post-hoc test was used. For the statistical analysis of the data, * or # as $P<0.05$,  or ## as $P<0.01$, * or ### as $P<0.001$, and **** or #### as $P<0.0001$ were used in this text.

As to the in vivo evaluation, the inventor has tested the probiotics of the present invention, and in particular a composition according to the present invention, for the treatment of lesions or wounds, in particular post-operative wounds and diabetes ulcers, in particular with biofilm resistant to antibiotic therapy, in order to better investigate the antibacterial effect and the re-epithelializing effect.

Examples concerning the application of the compositions according to the present invention to in vivo wounds and the corresponding results are herebelow provided.

Example 1—Application of a Composition of the Present Invention in Powder Form to the Foot of a Female Patient Affected by Ulcers Due to Diabetes and Bearing a Toe Amputation Wound The efficacy of a composition comprising *Lactobacillus plantarum* NCIMB 43029 as previously identified, *Lactobacillus acidophilus* NCIMB 43030 as previously identified and the known *Streptococcus thermophilus* as previously identified on diabetes ulcers and surgical wounds has been investigated.

In particular, an 83 year old woman affected by Critical Limb Ischemia (CLI) with ulcerative skin lesion of the right leg extending to the 2nd and 3rd toe was brought to our attention. Her medical history revealed type II diabetes mellitus, systemic arterial hypertension, ischemic heart disease (previous coronary artery bypass surgery) and atrial fibrillation (AF). She was also an active cigarette smoker (20 cigarettes/day for 20 years). According to clinical observation, bilateral femoral pulses were present, but the remaining periferic pulses (popliteal artery, posterior tibial and pepidia) were absent. The presence of ulceration on the right leg extended to the toes, with necrotic excara on the anterior and posterior face of the leg and parchment necrosis of the 2nd and 3rd toes; acupressure pain, preserved motility. The Ankle Brachial Index (ABI) was not monitorable in both legs.

At the time of admission, blood tests gave the following results: C-reactive protein (CRP), 101,000 μg/l; erythrocyte sedimentation rate (ESR), 100 mm/h; haemoglobin (HGB), 8.0 g/dl; platelets, 454,000 μg/l; leukocytes (WBC), 12,800/μl; international normalized ratio (INR), 1.87; partial thromboplastin time (PTT), ratio 2.3. Surgical treatment consisted of recanalization and percutaneous transluminal angioplasty (PTA) with drug delivery balloon (DEB) Ranger, 5×100 mm, of the superficial femoral artery (SFA) and right popliteal artery, followed by surgical courettage of necrotic lesions of the forefoot and amputation of the second toe of the right foot. The infectious disease expert reported, before the surgical intervention: " . . . significant increase in inflammatory parameters. It is recommended to start antibiotic therapy with TAZOCIN® (piperacillin+tazobactam), 4.5 g every 8 hours.".

After 8 days, with the improvement of the inflammatory markers, the infectivologist changed the antibiotic therapy to MINOCIN® (minocycline) 100 mg, 1 tablet×2 for 15 days, and the patient was discharged after a total of 21 days of hospitalization. At home, the patient underwent topical outpatient dressings on the margins of the wounds and amputation twice a week with antiseptic solution per pack, preceded by cleansing of the treated area, and a polymeric membrane (PolyMem®, Ferries Mfg.) was routinely applied.

36 days after discharge and home treatment, in view of the worsening clinical picture with a significant increase in wound exudate, despite four weeks of antibiotic therapy with amoxicillin (500 mg orally every 12 hours) empirically prescribed by the attending practitioner, the patient approached our facility. The wounds were moist with an abundant secretion and covered with fibrin. A local swab of the wounds was then immediately performed and confirmed the positivity for *Klebsiella pneumoniae, Enterococcus faecalis* and *Proteus mirabilis*. Three blood cultures were also performed, although the patient had not fever, and resulted to be negative.

Given the multiplicity of microorganisms present on the wounds and the general conditions of the patient who was severely prostrate, it was decided to perform dressings with a 10% iodopovidone skin solution for topical use (POVIDERM®, 10% skin solution). After 30 days, as no improvement was observed, systemic antibiotic treatment was discontinued. On a compassionate basis, having informed the patient and obtained her consent, a probiotic mixture in the form of a dry powder was applied to the wounds. The probiotic formulation was a composition comprising *Lactobacillus plantarum* NCIMB 43029*, Lactobacillus acidophilus* NCIMB 43030 and the known *Streptococcus thermophilus* (SEQ ID NO: 10). 0.5 g of composition was applied once daily.

A week after the probiotic treatment, the conditions of the wounds were stable. Two weeks later, the microbiological analysis resulted modified, and in the subsequent period a slow but progressive wound healing was clearly observed. The wound swab was negative for *Enterococcus faecalis* on day 48 (12 days after starting probiotic application), and negative for *Klebsiella pneumoniae* and *Proteus mirabilis* on day 57 (21 days after topical probiotic application). The use of the probiotic formulation was discontinued on day 60, 24 days after treatment.

Over the subsequent 90 days the wounds healed, albeit very slowly, treated at home with PolyMem, improving the comfort of the patient who started walking again and independently perform her daily tasks.

FIGS. 7A/7B show photographs of the patient's right foot on day 36 after discharge.

FIGS. 8A/8B show photographs of the patient's right foot on day 48 after discharge.

FIGS. 9A/9B show photographs of the patient's right foot on day 57 after discharge.

FIGS. 10A/10B show photographs of the patient's right foot on day 170 after discharge.

It should be noted that, prior to be treated with the composition of the present invention, the patient had been treated with antibiotics in order to eradicate the bacterial biofilm present on foot ulcers, but with almost zero results.

On the contrary, the composition of the present invention was well accepted by the patient who was also very satisfied with the healing result obtained on the ulcers and wounds affecting her foot.

Therefore, the composition of the present invention has been found to be safe, very effective both in terms of antibacterial and re-epithelializing action on lesions or wounds that also present biofilms of bacteria resistant to antibiotics.

The invention claimed is:

1. A medicine or medicament comprising:

(a) a bacterial combination comprising:

(i) a *Lactobacillus plantarum;*

(ii) a *Lactobacillus acidophilus* strain;

(iii) a *Streptococcus thermophilus* strain; or combination thereof, and (b) a *Bacillus amyloliquefaciens* comprising a 16S rRNA as encoded by SEQ ID NO: 10, wherein the *Lactobacillus plantarum* comprises:

(1) a *Lactobacillus plantarum* strain with accession number NCIMB 43029, or (2) a *Lactobacillus plantarum* strain comprising the hyper variable regions V1-V3 of a gene encoding for 16S rRNA of SEQ ID NO: 4, a groEL gene of SEQ ID NO: 5 and a pheS gene of SEQ ID NO: 6, and wherein the *Lactobacillus acidophilus* strain comprises:

(1) a *Lactobacillus acidophilus* strain with accession number NCIMB 43030, or (2) a *Lactobacillus acidophilus* strain comprising the hyper variable regions V1-V3 of a gene encoding for the 16S rRNA of SEQ ID NO: 1, a groEL gene of SEQ ID NO: 2 and a pheS gene of SEQ ID NO:3, wherein the *Streptococcus thermophilus* strain comprises the hyper variable regions V1-V2 of a gene encoding for the 16S rRNA of SEQ ID NO: 7, a recA gene of SEQ ID NO: 8 and a secA gene of SEQ ID NO: 9.

2. The medicine or medicament of claim 1, formulated for oral or topical use, or formulated as a powder, a granule, a gingival tablet, a vaginal tablet, a capsule or a gel.

3. The medicine or medicament of claim 1, wherein:

(a) the percentage by weight of the *Lactobacillus plantarum* in the medicine or medicament is in the range of 1% to 40% by weight on the basis of the total weight of the medicine or medicament;

(b) the percentage by weight of the *Lactobacillus acidophilus* in the medicine or medicament is in the range of 1% to 40% by weight on the basis of the total weight of the medicine or medicament;

(c) the percentage by weight of the *Streptococcus thermophilus* in the medicine or medicament is in the range of 0.5% to 20% by weight on the basis of the total weight of the medicine or medicament;

(d) the percentage by weight of the *Bacillus amyloliquefaciens* in the medicine or medicament is in the range of 0.1% to 10% by weight on the basis of the total weight of the medicine or medicament;

(e) the medicine or medicament comprises from between about 10% to 90% by weight of *Lactobacillus plantarum*, and from between about 90% to 10% by weight of *Lactobacillus acidophilus* on the basis of the total weight of the medicine or medicament;

(f) the medicine or medicament comprises from between about 20% to 80% by weight of *Lactobacillus plantarum*, from between about 40% to 10% by weight of *Lactobacillus acidophilus*, and from between about 40% to 10% by weight of *Streptococcus thermophilus* on the basis of the total weight of the medicine or medicament;

(g) the medicine or medicament comprises from between about 10% to 80% by weight of *Lactobacillus plantarum*, from between about 40% to 10% by weight of *Lactobacillus acidophilus*, from between about 40% to 9% by weight of *Streptococcus thermophilus*, and from between about 10% to 1% by weight of *Bacillus amyloliquefaciens* on the basis of the total weight of the medicine or medicament;

(h) the *Lactobacillus plantarum, Lactobacillus acidophilus, Streptococcus thermophilus* and *Bacillus amyloliquefaciens* are live bacteria; or (i) the *Lactobacillus plantarum, Lactobacillus acidophilus, Streptococcus thermophilus* and *Bacillus amyloliquefaciens* are non-viable.

4. The medicine or medicament of claim 1, formulated for topical administration.

5. The medicine or medicament of claim 1, formulated as a powder or granules for topical administration.

6. The medicine or medicament of claim 1, incorporated in a bandage for topical administration of the medicine or medicament.

7. The medicine or medicament of claim 1, formulated with a pharmaceutically acceptable excipient.

8. The medicine or medicament of claim 7, wherein the pharmaceutically acceptable excipient comprises algae, bee pollen, honey, ventilated clay or zeolite.

9. The medicine or medicament of claim 1, where the bacterial combination of step (a) comprises:

(i) a *Lactobacillus plantarum;*

(ii) a *Lactobacillus acidophilus* strain; and (iii) a *Streptococcus thermophilus* strain.

10. The medicine or medicament of claim 1, where the bacterial combination of step (a) comprises:

(i) a *Lactobacillus plantarum*; and (ii) a *Lactobacillus acidophilus* strain.

* * * * *